United States Patent
Hara et al.

(10) Patent No.: US 7,508,988 B2
(45) Date of Patent: Mar. 24, 2009

(54) METHOD, PROGRAM AND APPARATUS FOR IMAGE PROCESSING CAPABLE OF EFFECTIVELY PERFORMING IMAGE TRANSMISSION, AND A MEDIUM STORING THE PROGRAM

(75) Inventors: Junichi Hara, Yokohama (JP); Toshio Miyazawa, Kawasaki (JP); Fumihiro Hasegawa, Machida (JP); Hideaki Yamagata, Yokohama (JP); Hiroaki Nagatsuka, Ohta-ku (JP)

(73) Assignee: Ricoh Company, Ltd. (JP)

( * ) Notice: Subject to any disclaimer, the term of this patent is extended or adjusted under 35 U.S.C. 154(b) by 658 days.

(21) Appl. No.: 11/074,080

(22) Filed: Mar. 8, 2005

(65) Prior Publication Data

US 2005/0201624 A1 Sep. 15, 2005

(30) Foreign Application Priority Data

Mar. 9, 2004 (JP) ............................. 2004-065362

(51) Int. Cl.
*G06K 9/36* (2006.01)
(52) U.S. Cl. ...................................... 382/232; 382/240
(58) Field of Classification Search ................. 382/232, 382/233, 236, 243, 251; 709/231
See application file for complete search history.

(56) References Cited

U.S. PATENT DOCUMENTS

| | | | | |
|---|---|---|---|---|
| 6,864,916 B1 * | 3/2005 | Nayar et al. | ............. | 348/224.1 |
| 7,092,965 B2 * | 8/2006 | Easwar | ............. | 707/104.1 |
| 7,110,608 B2 * | 9/2006 | Chan et al. | ............. | 382/239 |
| 7,127,113 B2 * | 10/2006 | Ohnishi | ............. | 382/233 |
| 7,158,679 B2 * | 1/2007 | Sano et al. | ............. | 382/232 |
| 7,200,277 B2 * | 4/2007 | Joshi et al. | ............. | 382/248 |

(Continued)

FOREIGN PATENT DOCUMENTS

JP 05-233873 9/1993

(Continued)

OTHER PUBLICATIONS

Marcus J. Nadenau, "Visually Improved Image Compression by Combining a Conventional Wavelet-Codec WithTexture Modeling"IEEE Transactions on Image Processing, vol. 11, No. 11, Nov. 2002, pp. 1-11.*

(Continued)

*Primary Examiner*—Brian Q Le
*Assistant Examiner*—Mekonen Bekele
(74) *Attorney, Agent, or Firm*—Dickstein Shapiro LLP

(57) ABSTRACT

An image processing apparatus includes a receiving mechanism configured to receive a request, from at least one different image processing apparatus connected via a network, for transmission of a codestream generated in a way such that image data is divided into at least one region, each region being hierarchically compressed and stored in the image processing apparatus, a decomposing mechanism configured to decompose a codestream and retrieve the codestream in a component unit, an extracting mechanism configured to extract a target region from the codestream, a primary priority assigning mechanism configured to assign priority to the target region extracted by the extracting mechanism, and a primary transmitting mechanism configured for transmission of the codestream, decomposed in a component unit corresponding to the target region, to the different image processing apparatus requesting transmission of the codestream based on the priority assigned by the primary priority assigning mechanism.

52 Claims, 11 Drawing Sheets

U.S. PATENT DOCUMENTS

| | | | |
|---|---|---|---|
| 7,302,104 B2 * | 11/2007 | Suino | 382/240 |
| 2001/0048770 A1 * | 12/2001 | Maeda | 382/243 |
| 2002/0018598 A1 * | 2/2002 | Maeda et al. | 382/239 |
| 2004/0165789 A1 * | 8/2004 | Ii | 382/299 |
| 2004/0190782 A1 * | 9/2004 | Nomizu et al. | 382/232 |
| 2005/0058353 A1 * | 3/2005 | Matsubara | 382/233 |

FOREIGN PATENT DOCUMENTS

| | | |
|---|---|---|
| JP | 2001-157209 | 6/2001 |
| JP | 2001-197500 | 7/2001 |
| JP | 2001-222392 | 8/2001 |
| JP | 2001-346047 | 12/2001 |
| JP | 3278471 | 2/2002 |
| JP | 2003-179888 | 6/2003 |
| JP | 2003-230012 | 8/2003 |
| JP | 2001-3814456 | 6/2006 |
| WO | WO 03/077565 A1 * | 9/2003 |
| WO | WO 2004/006188 A2 * | 1/2004 |

OTHER PUBLICATIONS

Farag Ibrahim Younis Elnagahy, B. Šimák "Wavelet-Based Embedded Rate Scalable Still Image Coders: A review" Czech Technical University in Prague: Acta Polytechnica vol. 44 No. 1/2004, pp. 1-15.*

Ramy E. Aly and Magdy A. Bayoum, "High-Speed and Low-Power IP for Embedded Block Coding with OptimizedTruncation (EBCOT) Sub-Block in JPEG2000 System Implementation", Received Sep. 10, 2003; Revised Nov. 3, 2004; Accepted Feb. 23, 20.*

Japanese Office Action (4 pages).

* cited by examiner

FIG. 10
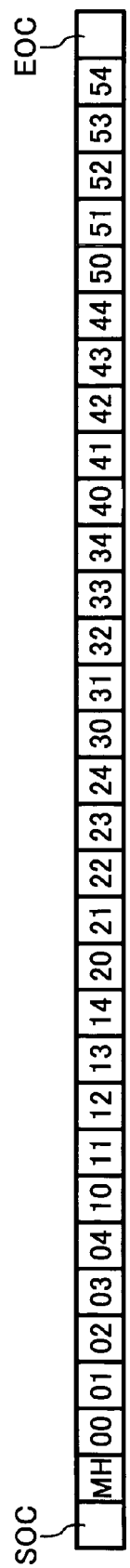
FIG. 11
FIG. 12
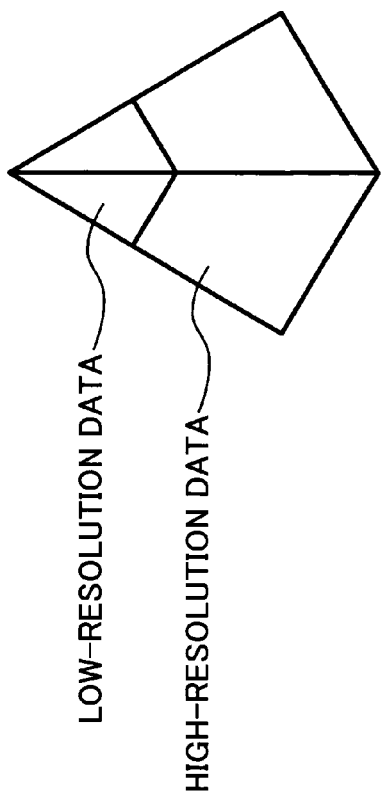

ORIGINAL IMAGE

EXTRACTED TARGET REGION
(TEXT DATA REGION)

NORMALIZATION
(HEIGHT H(H=H0))

NORMALIZATION
(WIDTH W(W=W0))

3H×W IMAGE

METHOD, PROGRAM AND APPARATUS FOR IMAGE PROCESSING CAPABLE OF EFFECTIVELY PERFORMING IMAGE TRANSMISSION, AND A MEDIUM STORING THE PROGRAM

BACKGROUND

This application claims priority to Japanese patent application No. 2004-065362 filed on Mar. 9, 2004 in the Japanese Patent Office, the entire contents of which are hereby incorporated herein by reference.

FIELD OF THE INVENTION

The present invention relates to a method, program and apparatus for image processing, and a medium storing the program. In particular, the present invention relates to a method, program and apparatus for image processing capable of effectively performing image transmission by a unique priority operation, and a medium storing the program.

DESCRIPTION OF THE RELATED ART

Image processing apparatuses, such as scanners, digital cameras, personal computers and the like, have become very popular to digitally obtain image data. The obtained digital image data may be stored in memories and storage units such as hard disk drives (HDDs), optical disk drives including CD-ROM drives, and/or may be transmitted and received via networks such as the Internet. However, an image data size of a high definition image is increasing, which makes processes for the high definition image difficult.

To eliminate the above-described problem, there are image compression and decompression algorithms for facilitating the processes for high definition images. Recently, a newly developed scheme called JPEG2000 has gradually been adopted as an international standard image compression and decompression algorithm.

In one technique using JPEG2000, an image processing apparatus divides the image into a number of rectangular regions (tiles) to perform compression and decompression processes in a condition provided with a small amount of memory. A tile is a basic unit to perform the compression and decompression processes so that the image processing apparatus may allow the compression and decompression processes to be performed individually on a tile-by-tile basis. JPEG2000 also divides an image of an image file into two resolution layers, i.e., low resolution data and high resolution data.

There are advantages to use an image file compressed according to the JPEG2000 algorithm.

For example, a plurality of image files compressed according to the JPEG2000 algorithm may be stored in a server computer such as a web server. When needed, a client server may request image transmission to retrieve only low resolution data from the image files compressed according to the JPEG2000 algorithm so that a browser can perform a thumbnail displaying process. A progressive transmission may also be employed as a transmission method in the above-described image transmission, so as to display the image in a progressive manner. Such transmission method can reduce an amount of network traffic when the image data is transmitted from the server computer to the client computer, thereby reducing a process time, e.g., for thumbnail displaying.

JPEG2000 further includes standards of coding methods such as JPM (JPEG2000 Part 6) format method in which a plurality of images can be hierarchically retained, JPIP (JPEG2000 Part 9) method in which JPEG2000 image files can be transmitted via communication protocols such as HTTP (Hyper Text Transfer Protocol), TCP (Transmission Control Protocol), IP Internet Protocol) and the like.

When operating an application such that a desired image is selected among images displayed in thumbnail forms stored in the server computer, the thumbnail image stored in the server computer needs to be transmitted to the application of the client computer.

The thumbnail image is just a cut-down version of an original image, and is generally too small to use for finding an appropriate image among the images stored in the server computer. That is, when an image larger than a thumbnail image is required, the entire image needs to be transmitted and it takes time to acquire the increased amount of image data because the data capacity becomes large.

Further, when a user wishes to confirm the image on a display unit before downloading the image, the server computer needs transmission of the image data of the entire thumbnail image to the application of the client server, which increases a transmission time.

SUMMARY

The present invention solves many of the problems resulting from above-described circumstances.

An object of the present invention is to provide a novel image processing apparatus that performs image transmission capable of processing image data by a unique priority operation to reduce a data transmission time and to facilitate a confirmation of the transmitted image data.

Another object of the present invention is to provide a novel image processing method that performs image transmission capable of processing image data by a unique priority operation to reduce a data transmission time and to facilitate a confirmation of the transmitted image data.

An object of the present invention is to provide a novel computer program product stored on a computer readable storage medium which, when run on an image processing apparatus, carries out an image processing method that performs image transmission capable of processing image data by a unique priority operation to reduce a data transmission time and to facilitate a confirmation of the transmitted image data.

An object of the present invention is to provide a novel computer readable medium that stores computer instructions for performing an image processing method that performs image transmission capable of processing image data by a unique priority operation to reduce a data transmission time and to facilitate a confirmation of the transmitted image data.

In one embodiment, a novel image processing apparatus includes a receiving mechanism, a decomposing mechanism, an extracting mechanism, a primary priority assigning mechanism, and a primary transmitting mechanism. The receiving mechanism is configured to receive a request, from a different image processing apparatus connected with the novel image processing apparatus via a network, for transmission of a codestream generated in a way such that image data is divided into at least one region, each region being hierarchically compressed and stored in the image processing apparatus. The decomposing mechanism is configured to decompose a codestream and to retrieve the codestream in a component unit. The extracting mechanism is configured to extract a target region from the codestream. The primary priority assigning mechanism is configured to assign priority to the target region extracted by the extracting mechanism.

The primary transmitting mechanism is configured for transmission of the codestream, decomposed in a component unit corresponding to the target region, to the different image processing apparatus requesting transmission of the codestream based on the priority assigned by the primary priority assigning mechanism.

The extracting mechanism may separate an image into graphic image data and text image data, and may extract the target region based on the separation result.

The extracting mechanism may separate an image into graphic image data and text image data, and may extract a region of the separated text image data as the target region. The primary priority assigning mechanism may, e.g., assign priority to text data region considered to be a title in the separated text image data.

The extracting mechanism may separate an image into graphic image data and text image data, and may extract the separated text image data as the target region. The primary priority assigning mechanism may, e.g., assign priority to text image data region having a large text size.

The extracting mechanism may separate an image into graphic image data and text image data, and may extract the separated graphic image data as the target region. The primary priority assigning mechanism may, e.g., assign priority to graphic image data having a large graphic image size.

The primary priority assigning mechanism may assign higher priority to a low resolution image portion of a region extracted as the target region, and may assign the same priority as a region other than the target region to an image other than the low resolution image of the region extracted as the target region same as a region other than the target region.

The primary priority assigning mechanism may assign higher priority to a low resolution image portion of a region extracted as the target region, and may assign a lower priority than a region other than the target region to an image other than the low resolution image of the region extracted as the target region.

The primary priority assigning mechanism may assign priority to an important image region based on a quantitative index representative of a visibility importance in the target region.

The primary priority assigning mechanism may perform a priority assigning operation according to a rendering area of the different image processing apparatus requesting transmission of the codestream.

The above-described image processing apparatus may further include a primary decoding mechanism, an image processing mechanism, and a primary encoding mechanism. The primary decoding mechanism is configured to decode the codestream of the target region having a high priority assigned by the primary priority assigning mechanism. The image processing mechanism is configured to perform an image processing operation with respect to the image data decoded by the primary decoding mechanism. The primary encoding mechanism is configured to hierarchically encode the image data processed by the image processing mechanism. The primary transmitting mechanism may transmit the codestream, decomposed in a component unit, corresponding to the target region encoded after the image processing operation, to the different image processing apparatus requesting transmission of the codestream based on the priority assigned by the primary priority assigning mechanism.

The image processing mechanism may also perform at least one operation of contrast conversion, color toner conversion, color intensity conversion, noise reduction and smoothing.

In one embodiment, a novel image processing method includes receiving a request, from a different image processing apparatus connected with an image processing apparatus via a network, for transmission of a codestream generated in a way such that image data is divided into at least one region, each region being hierarchically compressed and stored in the image processing apparatus, decomposing a codestream and retrieving the codestream in a component unit, extracting a target region from the codestream, assigning priority to the target region extracted by the extracting step, and transmitting the codestream, decomposed in a component unit corresponding to the target region, to the different image processing apparatus requesting transmission of the codestream based on the priority assigned by the assigning step.

The extracting step may separate an image into graphic image data and text image data, and may extract the target region based on the separation result.

The extracting step may separate an image into graphic image data and text image data, and may extract a region of the separated text image data as the target region. The assigning step may, e.g., assign priority to text data considered to be a title in the separated text image data.

The extracting step may separate an image into graphic image data and text image data, and may extract the separated text image data as the target region. The assigning step may, e.g., assign priority to text image data region having a large text size in the separated text image data.

The extracting step may separate an image into graphic image data and text image data, and may extract the separated graphic image data as the target region. The assigning step, e.g., may assign priority to graphic image data region having a large graphic image size in the separated graphic image data.

The assigning step may assign higher priority to a low resolution image of a region extracted as the target region, and may assign the same priority as a region other than the target region to an image other than the low resolution image of the region extracted as the target region.

The assigning step may assign higher priority to a low resolution image of a region extracted as the target region, and may assign a lower priority than a region other than the target region to an image other than the low resolution image of the region extracted as the target region.

The assigning step may select and assigns priority to an important image region based on a quantitative index with respect to a visibility importance in the target region.

The assigning step may perform a priority assigning operation according to a rendering area of the different image processing apparatus requesting transmission of the codestream.

The above-described novel image processing method may further include decoding the codestream of the target region having a high priority assigned by the assigning step, performing an image processing operation with respect to the image data decoded by the decoding step, and hierarchically encoding the image data processed by the performing step. The transmitting step may transmit the codestream, decomposed in a component unit, corresponding to the target region encoded after the image processing operation, to the different image processing apparatus requesting transmission of the codestream based on the priority assigned by the assigning step.

The performing step may perform at least one operation of contrast conversion, color toner conversion, color intensity conversion, noise reduction and smoothing.

In another embodiment, a computer program product stored on a computer readable storage medium run on an image processing apparatus carries out an image processing method, as described above.

Further, in another embodiment, a computer readable medium storing computer instructions performs an image processing method, as described above.

In one embodiment, a novel image processing apparatus includes a receiving mechanism, an extracting mechanism, a secondary decoding mechanism, a normalization mechanism, an aggregation mechanism, a secondary encoding mechanism, and a secondary transmitting mechanism. The receiving mechanism is configured to receive a request, from a different image processing apparatus connected with the novel image processing apparatus via a network, for transmission of a codestream generated in a way such that image data is divided into at least one region, each region being hierarchically compressed and stored in the image processing apparatus. The extracting mechanism is configured to extract a target region from a first codestream. The secondary decoding mechanism is configured to decode a second codestream corresponding to the target region extracted by the extracting mechanism. The normalization mechanism is configured to normalize the target region decoded by the secondary decoding mechanism. The aggregation mechanism is configured to aggregate the target region normalized by the normalization mechanism into a new image. The secondary encoding mechanism is configured to divide the new image aggregated by the aggregation mechanism into target regions, and to hierarchically encode the divided target region into a third codestream. The secondary transmitting mechanism is configured for transmission of a fourth codestream, having an image size of the different image processing apparatus requesting to transmit the codestream, to the different image processing apparatus, the fourth codestream being encoded from the third codestream according to a rendering area of the different image processing apparatus.

The above-described novel image processing apparatus may further include a secondary priority assigning mechanism configured to assign priority to the target region extracted by the extracting mechanism.

The above-described novel image processing apparatus may further include an image processing mechanism configured to perform an image processing operation with respect to the image data decoded by the secondary decoding mechanism. The secondary transmitting mechanism may transmit the fourth codestream, having an image size of the different image processing apparatus requesting transmission of the codestream, to the different image processing apparatus. The fourth codestream may be extracted from the third codestream after the image processing operation performed by the image processing mechanism.

Further, in one embodiment, a novel image processing method includes receiving a request, from a different image processing apparatus connected with an image processing apparatus via a network, for transmission of a codestream generated in a way such that image data is divided into at least one region, each region being hierarchically compressed and stored in the image processing apparatus, extracting a target region from a first codestream, decoding a second codestream corresponding to the target region extracted by the extracting step, normalizing the target region decoded by the decoding step, aggregating the target region normalized by the normalizing step into a new image, dividing the new image aggregated by the aggregating step into target regions, hierarchically encoding the divided target region into a third codestream, and transmitting a fourth codestream, having an image size of the different image processing apparatus requesting transmission of the codestream, to the different image processing apparatus, the fourth codestream encoded from the third codestream according to a rendering area of the different image processing apparatus.

The above-described novel image processing method may further include assigning priority to the target region extracted by the extracting step.

The above-described novel image processing method may further include performing an image processing operation with respect to the image data decoded by the decoding step. The transmitting step may transmit the fourth codestream, having an image size of the different image processing apparatus requesting transmission of the codestream, to the different image processing apparatus. The fourth codestream may be encoded from the third codestream by the encoding step after the image processing operation performed by the performing step.

In one embodiment, a computer program product stored on a computer readable storage medium run on an image processing apparatus carrying out an image processing method, as described above.

Further, in one embodiment, a computer readable medium storing computer instructions performs an image processing method, as described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10 is a diagram showing an image divided into two dimensions according to one embodiment of the present invention;

FIG. 11 is a diagram showing a compressed code generated in accordance with the JPEG2000 algorithm based on the divided image of FIG. 10 according to one embodiment of the present invention;

FIG. 12 is a diagram illustrating a resolution model of a compressed code generated in accordance with the JPEG2000 algorithm according to one embodiment of the present invention;

DETAILED DESCRIPTION

Figure 1:
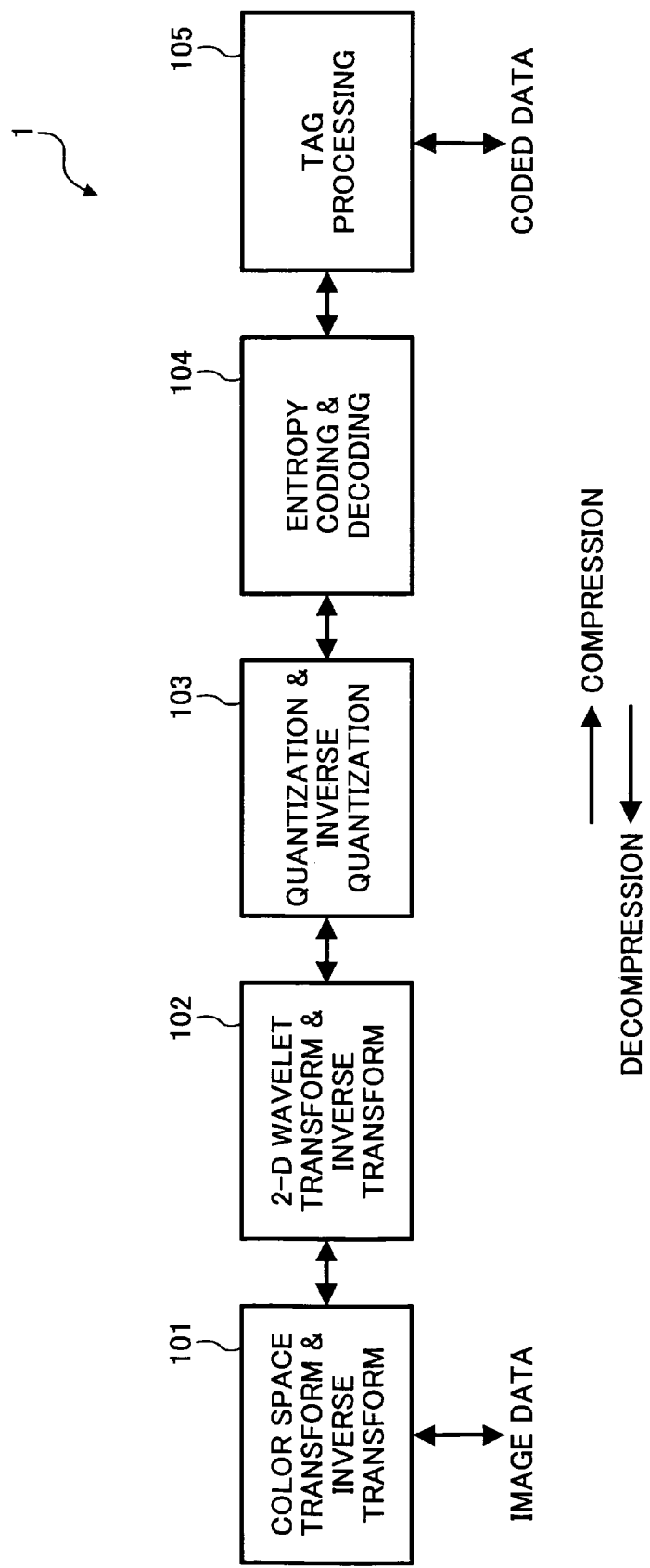
FIG. 1 is a functional block diagram showing a system realizing a hierarchical coding algorithm that forms the basis of the JPEG2000 standard, which an algorithm is a precondition for the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, preferred embodiments of this patent application are described.

A description will be given of one embodiment of an image processing apparatus according to the present invention. This embodiment of the image processing apparatus employs an embodiment of a computer-readable storage medium according to the present invention. Further, this embodiment utilizes the JPEG2000 algorithm.

A general description will first be given of the JPEG2000 algorithm. Since the JPEG2000 algorithm itself is known, a detailed description of the JPEG2000 algorithm will be omitted in this specification.

The following description schematically shows the "hierarchical coding algorithm" and the "JPEG2000 algorithm", which are the premises of the present invention.

Referring to FIG. 1, a system realizing the hierarchical coding algorithm that forms the basis of JPEG2000 is described. This system includes a color space conversion and inverse conversion unit 101, a two-dimensional (2-D) wavelet transform and inverse transform unit 102, a quantization and inverse quantization unit 103, an entropy encoding and decoding unit 104, and a tag processing unit 105.

One of the major differences between this system and the conventional JPEG algorithm is the transform method. JPEG employs the discrete cosine transform (DCT) while the hierarchical coding algorithm employs the discrete wavelet transform (DWT) in the 2-D wavelet transform and inverse transform unit 102. Compared with the DCT, the DWT has the advantage of excellent image quality in a highly compressed region. This advantage is one of the major reasons the DWT is employed in JPEG2000, which is a successor algorithm to JPEG.

Another major difference is that the hierarchical coding algorithm additionally includes a functional block called the tag processing unit 105 at the final stage of the system for code formation. The tag processing unit 105 generates compressed data as codestream data at the time of image compression and interprets codestream data necessary for decompression at the time of image decompression. The codestream data allows JPEG2000 to realize a variety of convenient functions. For example, the compression and decompression of a still image can be stopped freely at any hierarchy (decomposition level) corresponding to the octave division in the block-based DWT. This is described below with reference to FIG. 3. That is, a low-resolution part (a reduced image) can be extracted from a single file. Further, it is possible to extract part of an image (a tiling image).

The color space conversion and inverse conversion unit 101 is often connected to a unit for inputting and outputting an original image. For example, the color space conversion and inverse conversion unit 101 converts the RGB calorimetric system made up of primary color system components of red (R), green (G), and blue (B) or the YMC colorimetric system made up of complementary color system components of yellow (Y), magenta (M), and cyan (C) to the YUV or YCbCr calorimetric system, or performs the inverse conversion thereof.

Next, the JPEG2000 algorithm will be described.

Figure 2:
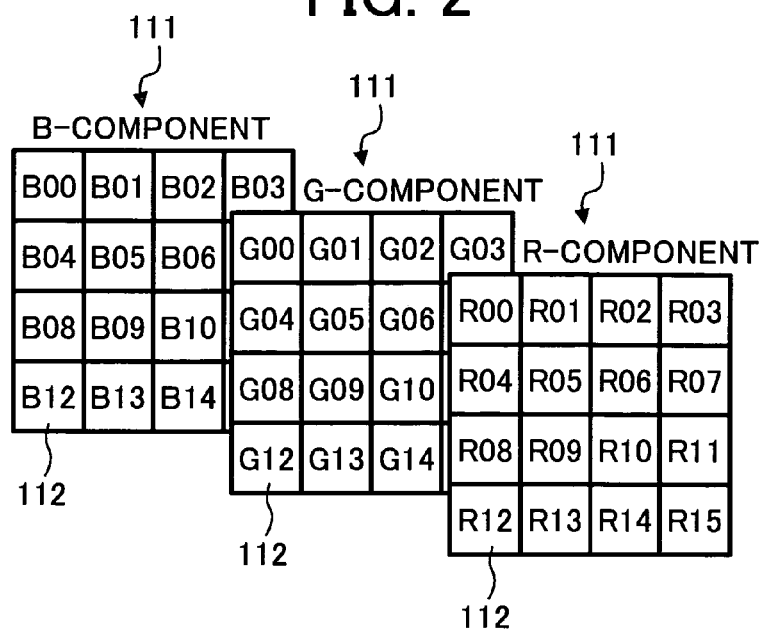
FIG. 2 is a diagram illustrating rectangular regions of each component of an original image according to the JPEG2000 standard.

Referring to FIG. 2, in a color image, generally, each of components 111 (RGB primary color system components in this case) of the original image is divided into rectangular regions 112 as shown in FIG. 2. Generally, the rectangular regions 112 are referred to as blocks or tiles. Since the rectangular regions 112 are generally referred to as tiles in JPEG2000, the rectangular regions 112 are hereinafter referred to as tiles. In the case of FIG. 2, each component 111 is divided into 16 (4×4) rectangular tiles 112. Each of the tiles 112 (R00, R01, ..., R15, G00, G 01, ..., G15, B00, B 01, ..., B15 in FIG. 2) becomes a basic unit in the process of compressing and decompressing image data. Accordingly, the compression and decompression of image data are independently performed for each component 111 and each tile 112.

In the case of encoding image data, the data of each tile 112 of each component 111 is input to the color space conversion and inverse conversion unit 101 and is subjected to color space conversion. After the color space conversion is performed, the data is subjected to 2-D wavelet transform (forward transform) in the 2-D wavelet transform and inverse transform unit 102 and is spatially divided into frequency bands.

Figure 3:
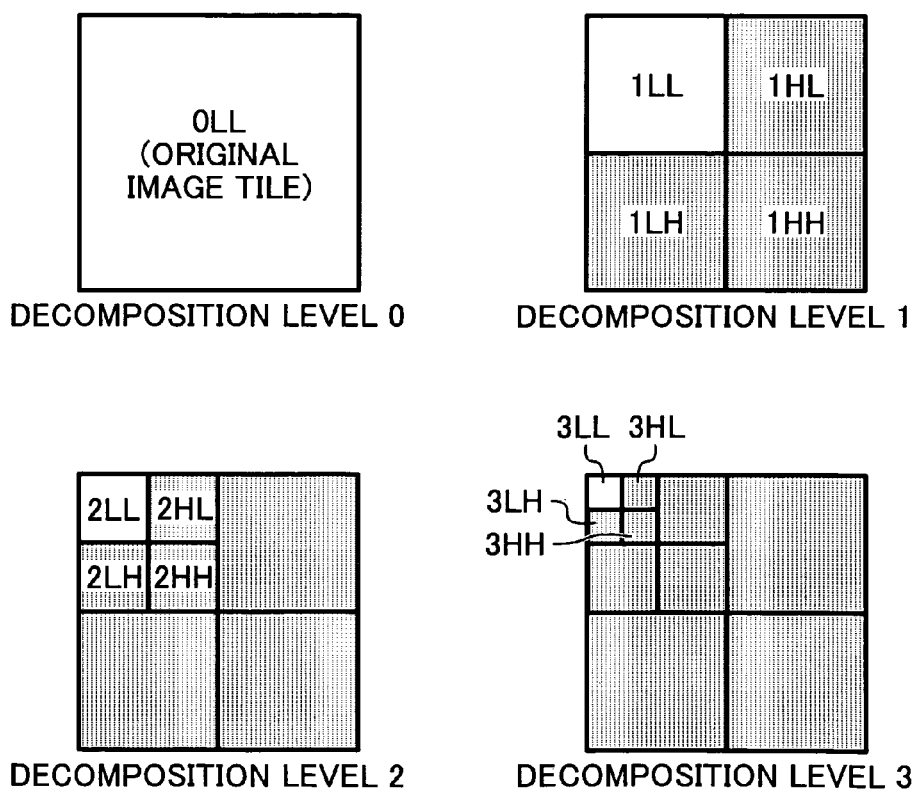
FIG. 3 is a diagram illustrating sub-bands at each decomposition level when the number of decomposition levels is three according to the JPEG2000 standard.

FIG. 3 is a diagram showing sub-bands of each decomposition level in the case where the number of decomposition levels is three. That is, the 2-D wavelet transform is performed on the tile original image (0LL) of Decomposition Level 0 obtained by dividing the original image into tiles, so that the sub-bands (1LL, 1 HL, 1LH, and 1HH) shown at Decomposition Level 1 are separated. Successively thereafter, the 2-D wavelet transform is performed on the low-frequency component of 1LL at this level so that the sub-bands (2 LL, 2HL, 2LH, and 2HH) shown at Decomposition Level 2 are separated. Similarly, the 2-D wavelet transform is performed on the low-frequency component of 2LL so that the sub-bands (3 LL, 3HL, 3LH, and 3HH) shown at Decomposition Level 3 are separated. In FIG. 3, the sub-bands to be subjected to encoding are indicated by hatching at each decomposition level. For example, when the number of decomposition levels is three, the hatched sub-bands (3HL, 3LH, 3 HH, 2HL, 2LH, 2HH, 1HL, 1LH, and 1HH) are to be subjected to encoding and the 3LL sub-band is not to be encoded.

Next, target bits to be encoded are determined in a specified encoding order. Then, the quantization and inverse quantization unit 103 generates a context from the peripheral bits of each target bit.

Figure 4:
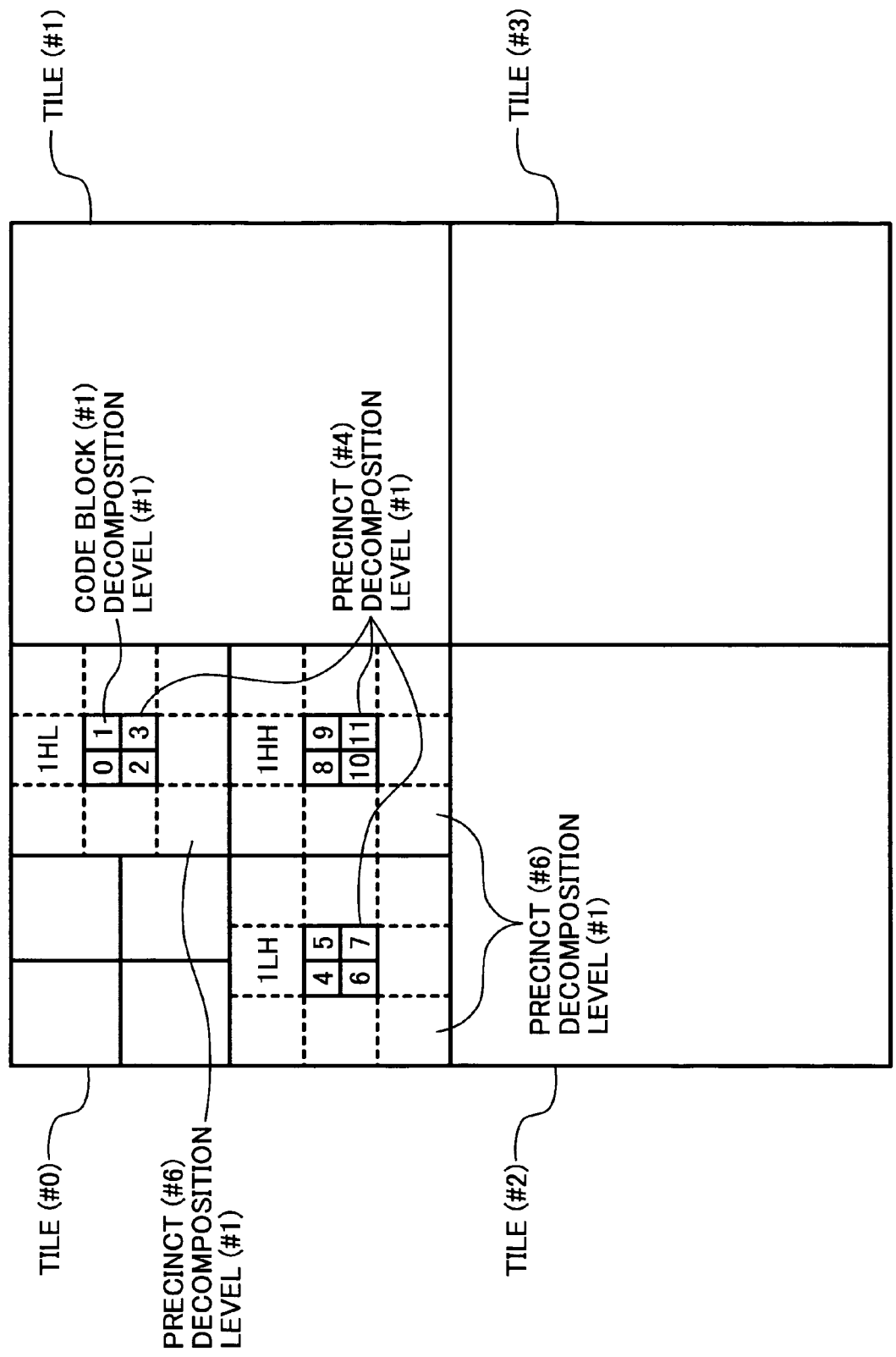
FIG. 4 is a diagram illustrating a precinct according to the JPEG2000 standard.

Sub-band by sub-band, the quantized wavelet coefficients are divided into non-overlapping rectangles called "precincts". The precincts are introduced for effective use of memory in implementation. Referring to FIG. 4, each precinct is composed of three spatially matching rectangular regions. Further, each precinct is divided into non-overlapping rectangular "code blocks." Each code block becomes a basic unit in performing entropy coding.

The coefficient values obtained after the wavelet transform may directly be quantized and encoded. In order to improve coding efficiency, however, JPEG2000 decomposes the coefficient values into units called "bit planes", which may be placed in order in each pixel or code block.

Figure 5:
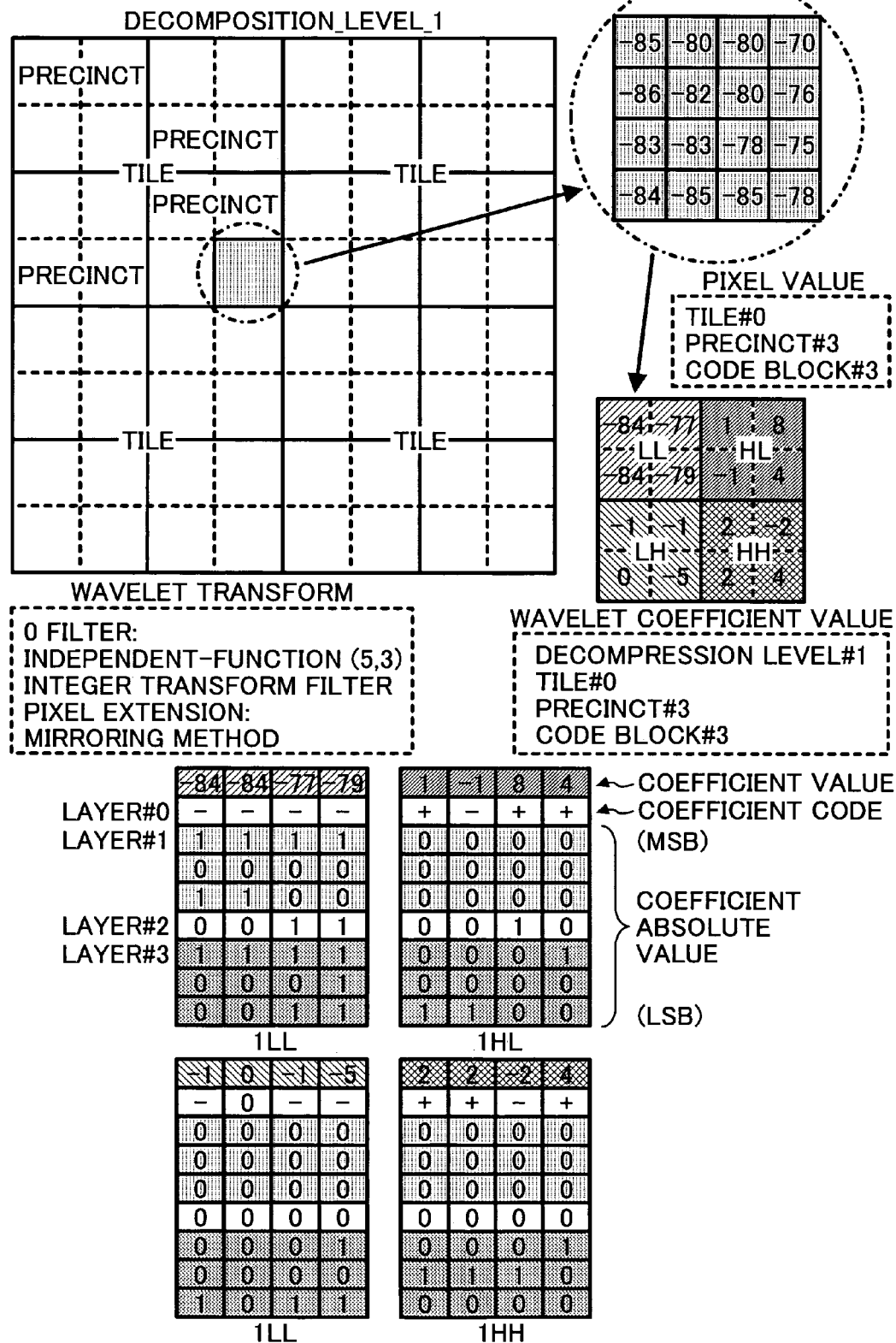
FIG. 5 is a diagram illustrating a process for placing bit planes in order according to the JPEG2000 standard.

Referring to FIG. 5, a process for placing the bit planes in order is described.

In the case of FIG. 5, an original image of 32×32 pixels is divided into four tiles, each tile being made of 16×16 pixels. Each precinct and each code block at Decomposition Level 1 are 8×8 and 4×4 pixels, respectively, in size. The precincts and the code blocks are respectively numbered according to a raster scan order. In this case, the precincts are assigned with numbers 0 through 3, and the code blocks are assigned with numbers 0 through 3. A mirroring method is employed in pixel expansion beyond a tile boundary, and the wavelet transform is performed with a reversible (5, 3) integer transform filter so that the wavelet coefficients of Decomposition Level 1 may be obtained.

Further, FIG. 5 also shows a conceptual typical "layer" structure for Tile 0, Precinct 3, and Code Block 3. Transformed Code Block 3 is divided into sub-bands (1LL, 1HL, 1LH, and 1HH), and the sub-bands are allocated with their respective wavelet coefficient values.

The layer structure is easier to understand when the wavelet coefficient values are viewed horizontally along the bit planes. One layer is composed of an arbitrary number of bit planes. In this case, Layers 0, 1, 2, and 3 are composed respectively of one, three, one, and three bit planes. A layer including a bit plane closer to the least significant bit (LSB) bit plane is subjected to quantization earlier, and a layer including a bit plane closer to the most significant bit (MSB) bit plane is subjected to quantization later. A method of discarding a layer closer to the LSB bit plane first is called truncation, by which the rate of quantization is finely controllable.

The entropy encoding and decoding unit 104 of FIG. 1 performs encoding on the tiles 112 of each component 111 by probability estimation from the contexts and the target bits. Thus, the encoding is performed in a unit of tile 112 for each component 111 of the original image. Finally, the tag processing unit 105 connects all the coded data supplied from the entropy encoding and decoding unit 104 into a single coded data stream (codestream data), and adds a tag thereto.

Figure 6:
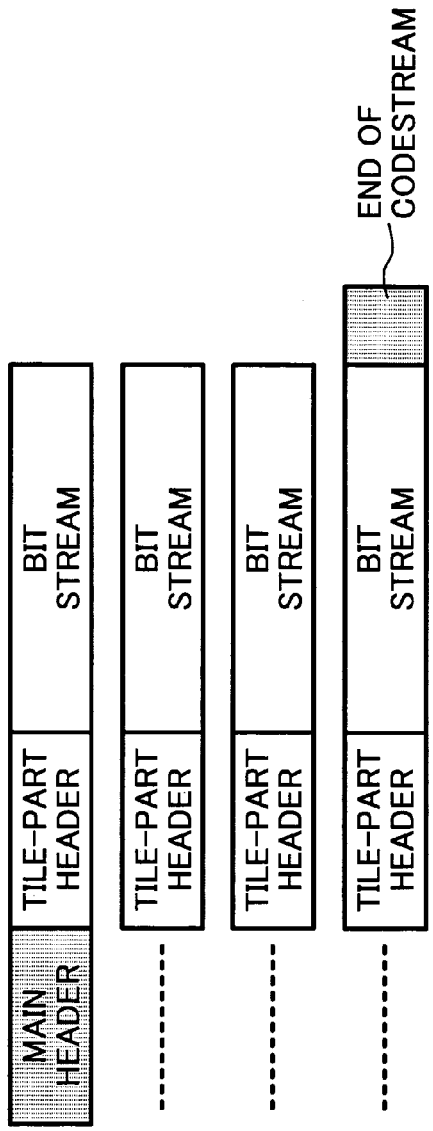
FIG. 6 is a schematic diagram showing a frame structure of codestream data according to the JPEG2000 standard.

Referring to FIG. 6, a frame structure of the codestream is described.

In FIG. 6, tag information called a main header is added to the head of the codestream data, and tag information called a tile-part header is added to the head of the coded data (bit stream) of each tile 112. Each tile-part header indicates a tile boundary position, and is followed by the coded data of the corresponding tile 112. A coding parameter and a quantization parameter are written to the main header. Another tag (end of codestream) is added to the terminal end of the codestream data.

Figure 7:
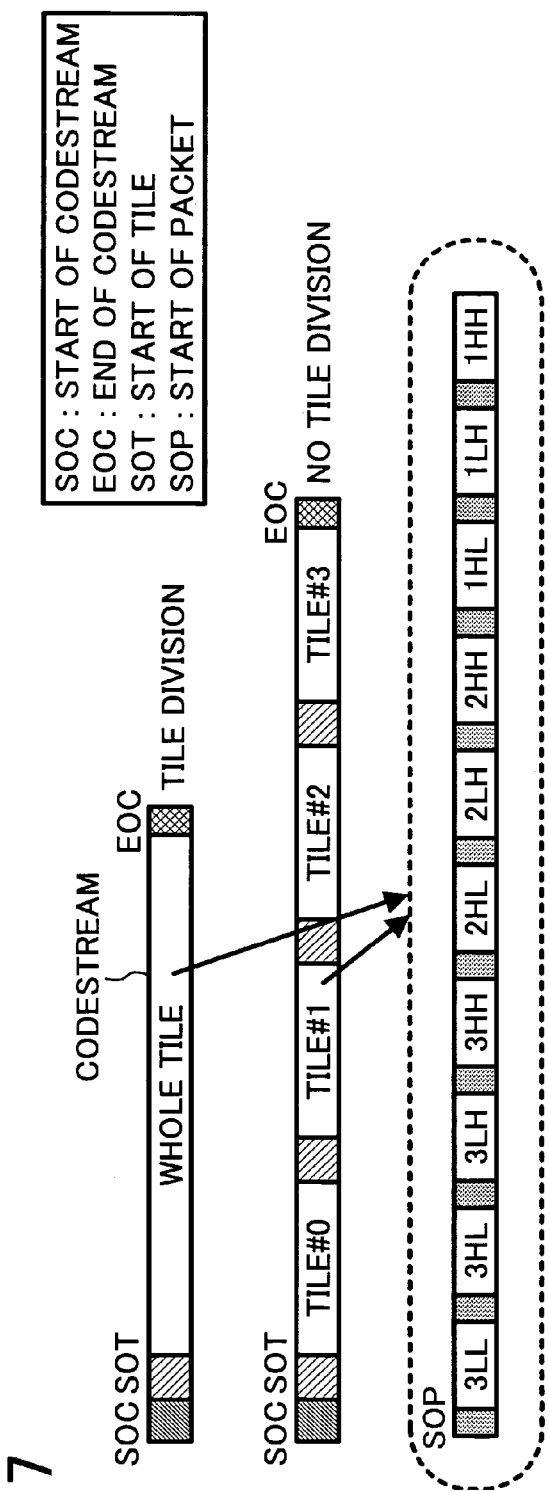
FIG. 7 is a schematic diagram showing a structure of codestream data indicating packets having respective encoded wavelet coefficients in a sub-band basis.

Referring to FIG. 7, another structure of the codestream is described.

In FIG. 7, a packet containing coded wavelet coefficients is described in a unit of sub-band. As shown in FIG. 7, similar packet strings are formed even when the tile division is performed or is not performed.

On the other hand, in the case of decoding coded data, image data is generated from the codestream data of the tiles 112 of the components 111 in the order reverse to that of the encoding of the image data. In this case, the tag processing unit 105 interprets the tag information added to the codestream data input from the outside. Then, the tag processing unit 105 decomposes the input codestream data into the codestream data of the tiles 112 of the components 111, and decodes (decompresses) the codestream data in a unit of tile 112 for each component 111. At this point, the positions of the target bits to be subjected to the decoding operation are determined according to the order based on the tag information within the codestream data, and the quantization and inverse quantization unit 103 generates a context from the arrangement of the peripheral bits (already decoded) of the position of each target bit. The entropy encoding and decoding unit 104 performs the decoding operation based on probability estimation from the contexts and the codestream data so as to generate the target bits, and writes the target bits to their respective positions. The thus decoded data is spatially divided into frequency bands. Therefore, each tile 112 of each component 111 of the image data can be restored by subjecting the decoded data to the 2-D wavelet inverse transform in the 2-D wavelet transform and inverse transform unit 102. The color space conversion and inverse conversion unit 101 converts the restored data to the image data of the original calorimetric system.

Next, a description is given with reference to FIGS. 8 through 17, of exemplary embodiments of the present invention. The following embodiments are based on an image compression and decompression technique represented by JPEG2000, but the present invention is not limited to the contents of the following description.

A description given below describes an embodiment of the present invention. In this embodiment, each of a server computer and a client computer performs image processing that is controlled by an image processing program installed therein or interpreted and executed thereby. In this embodiment, a storage medium storing such an image processing program is also described.

Figure 8:
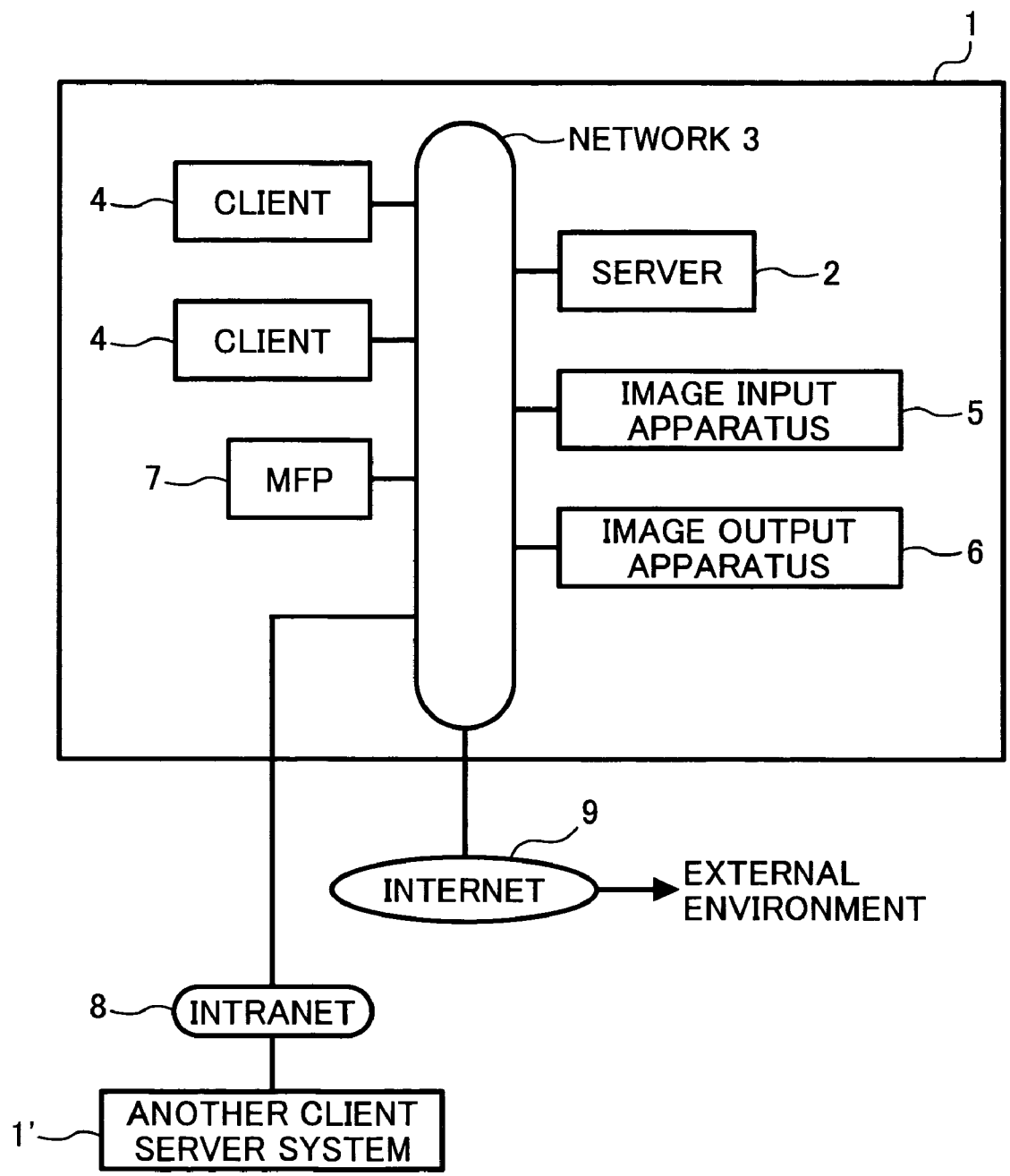
FIG. 8 is a diagram showing a configuration of an image data processing system according to an exemplary embodiment of the present invention.

Referring to FIG. 8, a configuration of an image data processing system according to one embodiment of the present invention is described.

The image data processing system of one embodiment may be a client server system 1 in which a plurality of client computers 4 are connected to a server computer 2, which is an image processing apparatus, through a network 3 such as a local area network (LAN).

According to the client server system 1, an image input apparatus 5 such as a scanner or a digital camera and an image output apparatus 6 such as a printer can be shared on the network 3. Further, a multifunction peripheral (MFP) 7 is connected to the network 3. The system environment may be constructed so that the MFP 7 functions as the image input apparatus 5 or the image output apparatus 6.

The client server system 1 is constructed so that data communications can be performed with another client server system 1' via an intranet 8 and with an external environment via the Internet 9.

The server computer 2 performs an image managing function for storing a variety of images as image data.

Figure 9:
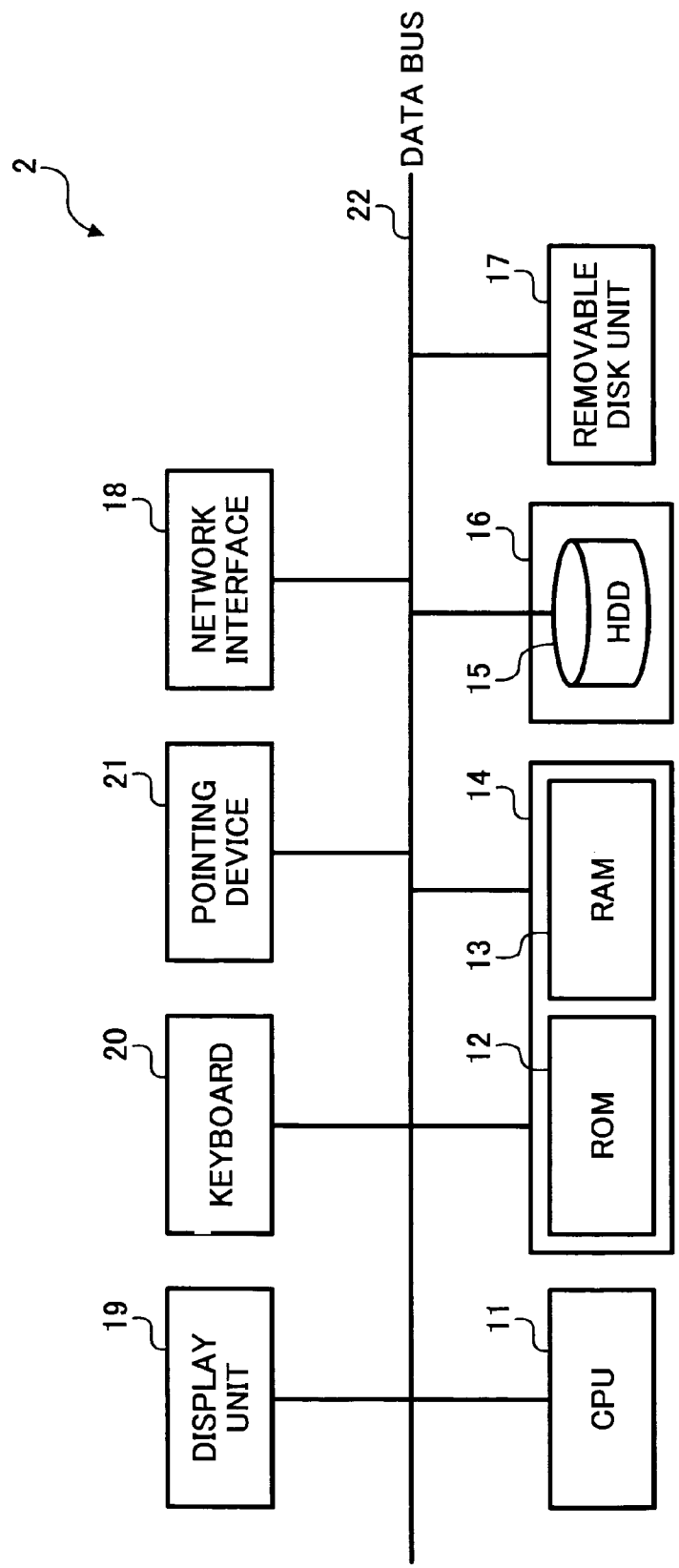
FIG. 9 is a module block diagram showing an image processing apparatus according to an embodiment of the present invention.

Referring to FIG. 9, a schematic structure of the server computer 2 as image processing apparatus is described in a module block diagram. The client computer 4 has a same structure and function as those of the server computer 2, and the discussion below includes the structures and functions of the server computer 2 and the client computer 4.

Each of the server computer 2 and the client computer 4 includes a central processing unit (CPU) 11, a primary storage device 14, a secondary storage derive 16, a removable disk unit 17, a network interface 18, a display unit 19, a keyboard 20, and a pointing device 21.

The CPU 11 performs information processing.

The primary storage device 14 includes a read-only memory (ROM) 12 and a random access memory (RAM) 13 for storing information.

The secondary storage device 16 includes a hard disk drive (HDD) 15 as a storage for storing image and document data files of various formats and a compressed code that is described below.

The removable disk unit 17 stores information, distributes information to the outside, and obtains information from the outside, such as a compact disk (CD) drive.

The network interface 18 communicates information with an external computer via the network 3.

The display unit 19 displays the progress and results of processing to an operator, such as a cathode ray tube (CRT) display or a liquid crystal display (LCD).

The keyboard 20 and the pointing device 21 such as a mouse are used for the operator to input commands and information to the CPU 11.

Each of the server computer 2 and the client computer 4 operates with a bus controller 22 arbitrating data exchanged among these components.

In this exemplary embodiment, a general personal computer forms the client computer 4 serving as an image processing apparatus, but a client computer is not limited to a personal computer, and other suitable apparatuses may be employed for the image processing operation, such as a portable information terminal called a personal digital assistants (PDA), a mobile phone, a palmtop PC, a personal handyphone system (PHS), and the like.

According to this embodiment, the HDD 15 of the server computer 2 stores and retains compressed and encoded image data. The image data stored in the HDD 15 of the server computer 2 is a compressed code generated based on the JPEG2000 algorithm. More specifically, when an image divided into rectangular regions (tiles) as shown in FIG. 10 is compressed and encoded, and the divided images (tiles) are arranged one-dimensionally, a compressed code having a configuration as shown in FIG. 11 is obtained. In FIG. 11, SOC indicates a marker segment that marks the start of a codestream, and MH indicates a main header storing values common to the entire codestream. The common values include, for example, a vertical tile size, a horizontal tile size, a vertical image size, and a horizontal image size. The main header MH is followed by the coded data of the tiles. Referring to FIG. 11, the data obtained by compressing the tiles of FIG. 10 horizontally (in a main scanning direction) and vertically (in a sub scanning direction) in accordance with the tile numbers of FIG. 10 are arranged. An EOC marker positioned at the end of the compressed code of FIG. 11 is a marker segment that indicates the terminal end of the compressed code.

Referring to FIG. 12, a resolution model of a compressed code generated in accordance with the JPEG2000 algorithm is described.

As shown in FIG. 12, it is possible to divide a compressed code generated in accordance with the JPEG2000 algorithm into low resolution data and high resolution data in a single image file. FIG. 12 shows only two types of resolutions. Actually, however, it is possible to extract compressed codes relating to multiple low-resolution parts of 1/2, 1/4, 1/8, 1/16, . . . , 1/2 n in accordance with the hierarchies (decomposition levels) corresponding to the octave division of the DWT, letting the entire data set be 1.

In each of the server computer 2 and the client computer 4, when a power is turned on by a user, the CPU 11 activates a program called a loader in the ROM 12, reads a program managing the computer hardware and software called an operating system (OS) from the HDD 15 into the RAM 13, and then activates the OS. The OS activates a program and reads and stores information in accordance with an operation by the user. As typical operating systems, Windows (trade mark registered) and UNIX (trade mark registered), for example, are well known. An operation program that runs on the OS is referred to as an application program.

Each of the server computer 2 and the client computer 4 stores an image processing program as an application program in the HDD 15. In this sense, the HDD 15 functions as a storage medium storing the image processing program.

Generally, an application program recorded on an optical information recording medium such as a CD-ROM or a DVD-ROM or a magnetic medium such as a floppy disk (FD) is installed in the secondary storage device 16 such as the HDD 15 of each of the server computer 2 and the client computer 4. Accordingly, a portable storage medium such as an optical information recording medium such as a CD-ROM or a magnetic medium such as a FD can be a storage medium storing the image processing program. Further, the image processing program may be read from the outside through the network interface 18 to be installed in the secondary storage device 16 such as the HDD 15.

In each of the server computer 2 and the client computer 4, when the image processing program that operates on the OS is activated, the CPU 11 performs operations in accordance with the image processing program to perform centralized control of the parts of the computer. Of the operations performed by the CPUs 11 of the server computer 2 and the client computer 4, a description is given of those characteristics of this exemplary embodiment.

When a real-time operation is considered to be important, it is preferable that a logic circuit (not shown) is separately provided to execute the operations at higher speed.

Figure 13:
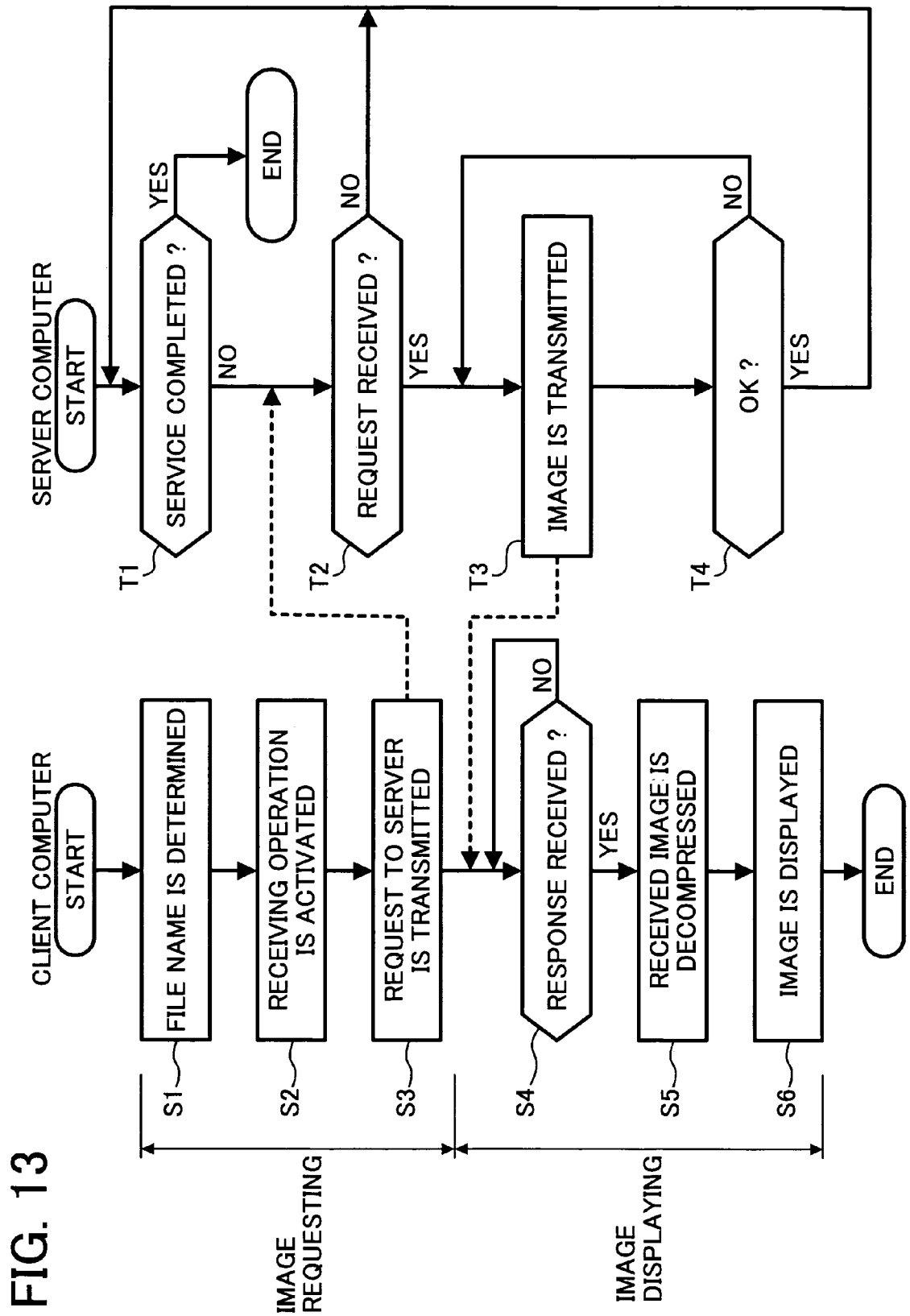
FIG. 13 is a flowchart of image request and display processes.

Referring to a flowchart of FIG. 13, image request and display operations performed by the server computer 2 and the client computer 4 to control image transmission are described. In the operations shown in FIG. 13, steps S1 through S3 performed by the client computer show the image requesting operations, and steps S4 through S6 performed by the client computer 4 show the image displaying operations. As previously shown in FIG. 9, the server computer 2 and the client computer 4 have same structures and functions. The discussion below uses reference numerals with respective suffixes, "a" for the server computer 2 and "b" for the client computer 4, for distinguishing respective components of the server computer 2 and the client computer 4. For example, the server computer 2 includes a CPU 11a, a ROM 12a, . . . and a data bus 22a, and the client computer 4 includes a CPU 11b, a ROM 12b, . . . and a data bus 22b.

In step S1 of FIG. 13, the CPU 11b of the client computer 4, which is operated by an operator with the keyboard 20 or the pointing device 21, determines a name of an image file of JPEG2000 stored and retained in the HDD 15a of the server computer 2. After step S1, the process goes to step S2.

In step S2, the CPU 11b activates a program performing an image receiving operation in step S4, which will be described later, and keeps the program in a standby state until an image requested by the client computer is transmitted from the server computer 2. After step S2, the process goes to step S3.

In step S3, the CPU 11b of the client computer 4 transmits the name of the image file of JPEG2000 determined in step S1, as a request signal, to the server computer 2. After step S3, the process goes to step S4.

The request signal transmitted in step S4 by the client computer 4 also includes a rendering area signal indicating a rendering area of the display unit 19b of the client computer 4. The rendering area indicates a size of a window in which an image is rendered in the display unit 19. The rendering area includes areas rendering images. For example, a rendering area can include the entire screen of the display unit 19 (PDA, PalmTop PC, legacy PC and the like), a specific window when multiple windows are used in a general personal computer and the like), and a predetermined area prepared in an application for pasting an image, for example, an area for pasting a thumbnail image to an album software and the like.

Same as the client computer 4, the server computer 2 performs the image requesting operations.

In step T1, the CPU 11a of the server computer 2 determines whether a service completion signal is received. When the service completion signal is received, the determination result in step T1 is YES, the server computer 2 completes the operation. When the service completion signal is not received, the determination result in step T1 is NO, and the process goes to step T2.

In step T2, the CPU 11a of the server computer 2 determines whether the request signal transmitted from the client computer 4 is received. When the request signal is not received, the determination result in step T2 is NO, and the process goes back to step T1. When the request signal is received, the determination result in step T2 is YES, the process goes to step T3.

Here, detailed operations of image transmitting performed by the server computer 2 in step T3 are described. That is, the CPU 11a of the server computer 2 performs the image transmitting when the server computer 2 receives the request signal transmitted by the client computer 4.

After the server computer 2 receives the name of the image file of JPEG2000 as the request signal from the client computer 4 in step T2, the server computer 2 executes image transmission according to the rendering area of the client computer 4 with respect to the image file of JPEG2000 in step T3.

Figure 14:
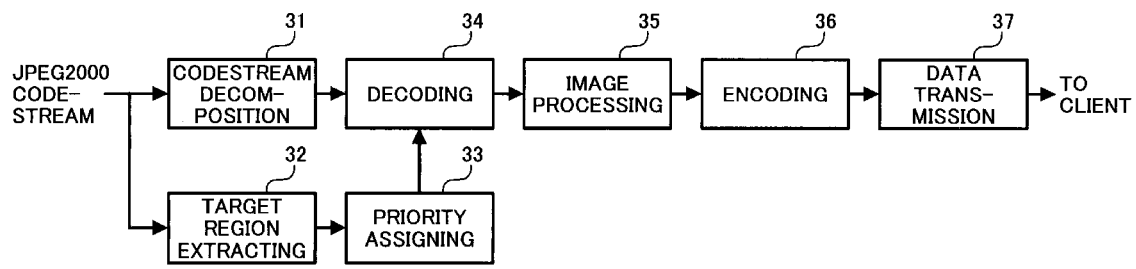
FIG. 14 is a functional block diagram showing image transmission processes performed by a server computer.

Referring to FIG. 14, the image transmission performed by the CPU 11a of the server computer 2 based on the image processing program is described.

As shown in FIG. 14, the CPU 11a of the server computer 2 operates in accordance with the image processing program. The image processing program includes a codestream decomposition unit 31, a target region extracting unit 32, a priority assigning unit 33, a decoding unit 34, an image processing unit 35, an encoding unit 36, and a data transmission unit 37.

The codestream decomposition unit 31 is a decomposing mechanism configured to decompose a predetermined codestream of JPEG2000 stored and retained in the HDD 15a of the server computer 2 and to retrieve the decomposed codestream in a component unit.

The target region extracting unit 32 is an extracting mechanism configured to extract a target region.

The priority assigning unit 33 is a primary priority assigning mechanism configured to assign the priority of each target region extracted by the target region extracting unit 32.

The decoding unit 34 is a primary decoding mechanism configured to decode the codestream assigned high priority by the priority assigning unit 33 in accordance with the "JPEG2000 algorithm".

The image processing unit 35 is an image processing mechanism configured to perform image processing operations with respect to the image decoded by the decoding unit 34.

The encoding unit 36 is a primary encoding mechanism configured to encode the image data after the image processing operation by the image processing unit 35 in accordance with the "JPEG2000 algorithm".

The data transmission unit 37 is a primary image transmission unit.

Detailed operations performed by each of the above-described units of the image processing program for the server computer 2 are described below.

The codestream decomposition unit 31 decomposes the codestream of JPEG2000 into a header and a component. There are two types of decomposition methods in the JPIP, one is a tile-based JPT stream method for retrieving tile data and the other is a precinct-based JPP stream method for retrieving precinct data.

A target region extracted by the target region extracting unit 32 is, for example, a region obtained by a separation of an image into text image data and graphic image data. When text image data is important, text data regions can be extracted as target region. When graphic image data is important, graphic data regions can be extracted as target region. Since text images and graphic images are substantially important to know the contents of the image data, such text or graphic image data is assigned the highest priority as a target region and is transmitted to the client computer 4 requesting transmission of of the image. Accordingly, when the image data is received, the client computer 4 can quickly confirm the image.

For separating an image into text image data and graphic image data, a plurality of methods may be used. For example, operations in one method are such that an image is binarized to extract groups of continuous-darkness pixels is extracted, and a group of continuous-darkness pixels considered to have text data is then formed as a text line. Accordingly, an arbitrary of a document image is determined to separate into text image data and graphic image data.

ROI (Region Of Interest) in JPEG2000 may be a target region to be extracted by the target region extracting unit 32. The ROI refers to a part of the entired image that is cut out and enlarged or is highlighted relative to other parts. An ROI is a technique used to relatively enhance the image quality compared to other parts. A detailed description of the ROI will be omitted in this specification since the ROI technique itself is known.

Following are examples of a standard of priority assigning in the priority assigning unit 33. For example, the priority assigning unit 33 may assign priority to: text data after text parts and graphic parts on an image are separated; text data considered to be a title in the separated text data; and/or text data having a large text size in the separated text data.

The "text data considered to be a title" or the "text data having a large text size" are prioritized because these text data are considered to be important when determining the image data. The "text data considered to be a title" may be determined based on its position, text size and the like. Further, the "text data considered to be a title" may be determined whether the text has a color different from other texts, or whether the text is underlined. That is, when the standard of priority assigning is set to "text data after the text parts and graphic parts on an image are separated", the priority assigning unit 33 may assign a priority to the codestream of the text data region higher than the graphic data region.

When the standard of priority assigning is set to "text data considered to be a title", the priority assigning unit 33 extracts the title of the input image and obtains information of the title region. Based on the information, the priority assigning unit 33 may assign a priority to the codestream of the text data region higher than the graphic data region, and may further assign higher priority to the codestream of the title in the separated text data region.

When the standard of priority assigning is set to "text data having a large text size", the priority assigning unit 33 determines the test data of the input image and obtains information of the text size. Based on the information, the priority assigning unit 33 may assign priority to the codestream of the text data region higher than the graphic data region, and may further assign higher priority to the codestream having a large text size in the separated text data region.

Namely, of the text data region extracted as a target region, the text data considered to be a title or the text data having a large text size may have a highest priory to be transmitted to the client computer 4 requesting the image. Since the text data considered to be a title and the text data having a large text size may be substantially important to know the contents of the image data, the client computer 4 can quickly confirm the image.

As an alternative, graphic image data may be a target region to have a priority.

For example, the priority assigning unit 33 may assign priority to: graphic data after text parts and graphic parts on an image are separated, graphic data having a large graphic image size in the separated graphic data.

When the standard of priority assigning is set to "graphic data having a large graphic image size", the priority assigning unit 33 determines the graphic data of the input image and obtains information of the graphic image size. Based on the information, the priority assigning unit 33 may assign priority to the codestream of the graphic data region higher than the text data region, and may further assign higher priority to the codestream having a large graphic image size in the separated graphic data region. The "graphic data having a large graphic image size" may be prioritized because the graphic data is considered to be substantially important when determining the image data. That is, of the graphic image data extracted as a target region, the graphic data having a large graphic image size may be assigned the highest priory to be transmitted to the client computer 4 requesting the image. Since the graphic data having a large graphic image size may be substantially important to know the contents of the image data, the client computer 4 can quickly confirm the image.

Further, with respect to the target region prioritized according to the above-described standards of priority assigning, further prioritization may be performed according to detailed standards of priority assigning. For example, the priority assigning unit 33 may assign priority such that: the entire codestream extracted as a target region comes before the other codestreams of regions other than the target region; a codestream of a low region image (i.e., a low resolution image of a wavelet hierarchy) of a region extracted as a target region is assigned higher priority and codestreams of region images other than the low region image of the target region are assigned a same priority to the other codestreams of regions other than the target region; and/or a codestream of a low region image (i.e., a low resolution image of a wavelet hierarchy) of a region extracted as a target region is assigned the highest priority and codestreams of region images other than the low region image of the target region is assigned the lowest priority to be transmitted after the other codestreams of regions other than the target region.

When the low region image (i.e., a low resolution image of a wavelet hierarchy) of the region extracted as a target region is assigned higher priority and codestreams of region images other than the low region image of the target region are assigned same priority as the other codestreams of regions other than the target region, the low resolution image of the target region is first transmitted to the client computer 4 requesting the image, and the region images other than the low resolution image of the target region are transmitted to the client computer 4 in synchronization with the other codestreams of regions other than the target region, after the low resolution image of the target region. Therefore, the client computer 4 can relatively quickly confirm the contents of the regions other than the target region.

When the low region image (i.e., a low resolution image of a wavelet hierarchy) of a region extracted as a target region is assigned the highest priority and codestreams of region images other than the low region image of the target region is assigned the lowest priority to be transmitted after the other codestreams of regions other than the target region, the low resolution image of the target region is first transmitted to the client computer 4 requesting the image, the regions of other than the target region is then transmitted, and finally the region images other than the low resolution image of the target region are transmitted. Therefore, the client computer 4 can quickly confirm the contents of the regions other than the target region.

Further, the priority assigning unit 33 may determine a priority such that an entropy distribution or a bit allocation of an image encoder with respect to a multi-scale area is estimated according to the header information contained in the JPEG2000 file information so as to obtain a quantitative index with respect to a visibility importance of the basic image characteristics. Thus, the quantitative index with respect to the visibility importance may be used to select an important image region to assign priority. More particularly, according to the header information of the JPEG2000 file information, file information, such as the length of coded blocks, the number of zero bit planes, the number of encoding passes and the like, is used to determine the entropy distribution. Accordingly, a portion having a high quantitative index with respect to the visibility importance is considered to be substantially important to know the contents of the image data, and is transmitted to the different image processing apparatus in a highest priority, thereby the different image processing apparatus can quickly confirm the image.

The priority assigning operations performed in the priority assigning unit 33 are not particularly limited to the above-described standards of priority assigning. As an alternative, the priority assigning operations performed in the priority assigning unit 33 may be executed according to a rendering area signal indicating the rendering area of the display unit 19*b* of the client computer included in the request signal transmitted by the client computer 4. For example, when the client computer 4 is a mobile phone, the display unit 19*b* of the client computer 4 is small. Therefore, the low region image (i.e., a low resolution image of a wavelet hierarchy) of a target region solely has a priority.

The decoding unit 34 decodes the codestream of JPEG2000 of the target region extracted by the target region extracting unit 32, according to the "JPEG2000 algorithm". Since the decoding operation is previously described in the hierarchical coding algorithm, including the color space transform and inverse transform unit 101, the two-dimensional wavelet transform and inverse transform unit 102, the quantization and inverse quantization unit 103, the entropy coding and decoding unit 104, and the tag processing unit 105, shown in FIG. 1, the detailed description of decoding will be omitted.

The image processing unit 35 performs at least one image processing operations of contrast conversion, color tone conversion, color intensity conversion, noise reduction, smoothing and the like, with respect to the image decoded by the decoding unit 34. For example, when text image data is selected as a target region, the contrast conversion may be performed to make the text on the image clear. When graphic image data is selected as a target region and the graphic image data includes moiré highlighted against the rest of the regions, the smoothing may be performed to effectively adjust the image. Thus, the at least one image processing operation is performed on the image decoded by the decoding unit 34 that is the image selected as the target region, and noises on the image are decreased. Therefore, the data amount of the entire image can be reduced and the image transmission can be made at a higher speed.

The encoding unit 36 encodes the image according to the "JPEG2000 algorithm" after the image processing operation is performed by the image processing unit 35. Since the encoding operation is previously described in the hierarchical coding algorithm, including the color space transform and inverse transform unit 101, the two-dimensional wavelet transform and inverse transform unit 102, the quantization and inverse quantization unit 103, the entropy coding and decoding unit 104, and the tag processing unit 105, shown in FIG. 1, the detailed description of decoding will be omitted.

When the client computer 4 transmits the request signal, the data transmission unit 37 transmits the codestream, decomposed in a component unit corresponding to the target region to the client computer, according to the priority assigned by the primary priority assigning unit 33.

As described above, the server computer 2 extracts one or more target regions from the image data that is formed in a JPEG2000 codestream, assigns priority to the extracted target regions, and transmits the image data of the target region having a high priority, to the client computer 4 previously transmitted the request signal. For example, when the low region image (i.e., a low resolution image of a wavelet hierarchy) of a region extracted as a target region is assigned the highest priority and codestreams of region images other than the low region image of the target region is assigned priority lower than the regions other than the target region, the low region image (i.e., a low resolution image of a wavelet hierarchy) of the target region is first transmitted to the client computer 4 requesting the image. Then, the low region image (i.e., a low resolution image of a wavelet hierarchy) of the regions other than the target region is transmitted, followed by the high region image (i.e., a high resolution image of a wavelet hierarchy) of the target region. Finally, the high region image (i.e., a high resolution image of a wavelet hierarchy) of the regions other than the target region is transmitted to the client computer 4.

Referring back to the flowchart of FIG. 13, the operations performed by the server computer 2 and the client computer 4 are described.

After the server computer 2 executes image transmission according to the rendering area of the client computer 4 transmission of the image file of JPEG2000 in step T3, the process in the server computer goes to step T4 and that in the client computer goes to step S4.

In step T4 of FIG. 13, the CPU 11*a* of the server computer 2 confirms whether the image data in a form of a JPEG2000 codestream is successfully transmitted to the client computer 4 that has requested transmission of the image data. There are several factors that may cause various network troubles, for example, the client computer 4 is in a busy state, the network is disconnected, and the like. There are countermeasures to eliminate errors due to the above-described network troubles as well. However, the details of the countermeasures will be omitted here.

When the image data in a form of a JPEG2000 codestream is not successfully transmitted to the client computer 4, the determination result in step T4 is NO, and the process goes back to step T3 transmission of again to the client computer the image data requested by the client computer 4.

When the image data in a form of a JPEG2000 codestream is successfully transmitted to the client computer 4, the determination result in step T4 is YES, and the process goes back to step T1 so that the server computer 2 enters in a standby state to wait for a next request.

When the server computer 2 detects the service completion signal after the process goes back to step T1, the server computer 2 terminates the service.

Accordingly, the service is terminated when a series of operations for one service is completed, so that a confirmation of the service may be made in an early stage.

After the server computer 2 transmits the image data in a form of the JPEG2000 codestream as the request signal to the client computer 4, the process in the client computer 4 goes to the step S4.

In step S4, the CPU 11*b* of the client computer 4 determines whether the client computer 4 receives the image data in a form of JPEG2000 codestream form the server computer 2. When the client computer 4 has successfully received the image data, the determination result in step S4 is YES, and the process goes to step S5. When the client computer 4 has not yet received the image data in a form of the JPEG2000 codestream from the server computer 2, the determination result in step S4 is NO, and the process of step S4 repeats until the client computer 4 receives the image data.

In step S5, the CPU 11*b* of the client computer 4 performs a decompression operation, which is a decoding operation, with respect to the image data in a form of the JPEG2000 codestream. After step S5, the process goes to step S6.

In step S6, the client computer 4 displays an image corresponding to the image data in a form of the JPEG2000 codestream in the display unit 19*b*. A detailed description of the decoding operation in accordance with the "JPEG2000 algorithm" will be omitted in this specification since the decoding technique itself is known.

As described above, the image data in a form of the JPEG2000 codestream may be divided into one or more target regions and may be assigned priority for each of the divided target regions. Thus, the image data in a form of the JPEG2000 codestream of the target region having a high priority may be transmitted prior to other regions to the client computer 4. With the above-described operations, the server computer 2 may reduce the data transmission time and the client computer 4 may quickly confirm the image. Further, in a progressive display, the image data may effectively be displayed.

Figure 15:
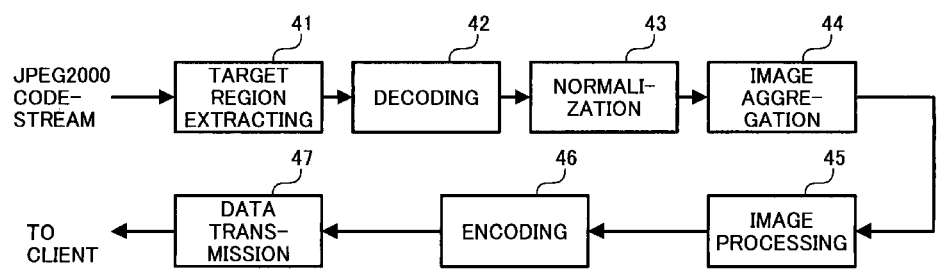
FIG. 15 is a functional block diagram showing another image transmission processes performed by the server computer according to another embodiment of the present invention.

Referring to FIGS. 15 and 16 A-16E, image processing operations of another exemplary embodiment of the present invention will be described. In FIGS. 15 and 16A-16E, those units that have same structures and functions as those of the corresponding units in FIGS. 1 through 14 are designated by the same reference numerals, and a description thereof will be omitted. Image processing of the server computer 2 described in this embodiment is different from that described in the previous exemplary embodiment, even though the reference numerals used are same.

The image processing performed by the CPU 11a of the server computer 2 based on the image processing program is described in FIG. 15.

As shown in FIG. 15, the CPU 11s of the server computer 2 operates in accordance with the image processing program. The image processing program includes a target region extracting unit 41, a decoding unit 42, an image normalization unit 43, an image aggregation unit 44, an image processing unit 45, an encoding unit 46, and a data transmission unit 47.

The target region extracting unit 41 is an extracting mechanism configured to extract a target region from a predetermined JPEG2000 codestream stored and retained in the HDD 15a of the server computer 2.

The decoding unit 42 is a secondary decoding mechanism configured to decode the target region extracted by the target region extracting unit 41 in accordance with the "JPEG2000 algorithm".

The image normalization unit 43 is an image normalizing mechanism configured to normalize the image decoded by the decoding unit 42.

The image aggregation unit 44 is an image aggregation mechanism configured to aggregate the images in the target region normalized by the image normalization unit 43 into one image.

The image processing unit 45 is an image processing mechanism configured to perform image processing operations with respect to the image aggregated by the image aggregation unit 44.

The encoding unit 46 is a secondary encoding mechanism configured to encode the image data after the image processing operation is performed by the image processing unit 45 in accordance with the "JPEG2000 algorithm".

The data transmission unit 47 is a secondary image transmission unit.

Since the target region extracted by the target region extracting unit 41 is functionally same as that extracted by the target region extracting unit 32 shown in FIG. 14, the detailed description will be omitted.

The decoding unit 42 decodes the codestream of JPEG2000 of the target region extracted by the target region extracting unit 41 in accordance with the "JPEG2000 algorithm". Since the decoding operation is previously described in the hierarchical coding algorithm of FIG. 1, including the color space transform and inverse transform unit 101, the two-dimensional wavelet transform and inverse transform unit 102, the quantization and inverse quantization unit 103, the entropy coding and decoding unit 104, and the tag processing unit 105, the detailed description of decoding will be omitted.

The image normalization unit 43 normalizes the image of the target region extracted by the target region extracting unit 41 and decoded by the decoding unit 42 in accordance with the "JPEG2000 algorithm". For example, in a case in which a target region is a text data region, the extracted text data region has a variety of text sizes. More particularly, a title in the extracted text data region generally has a font size larger than that of other texts in the extracted text data region. In this exemplary embodiment, each text line in the image may be normalized according to the height of the text line of the extracted target region, which is the text data region in this case.

Referring to FIGS. 16A, 16B, 16C, 16D and 16E, processes of normalizing an image according to the largest height of the target regions, in this case regions of text data, are described.

Figure 16A:
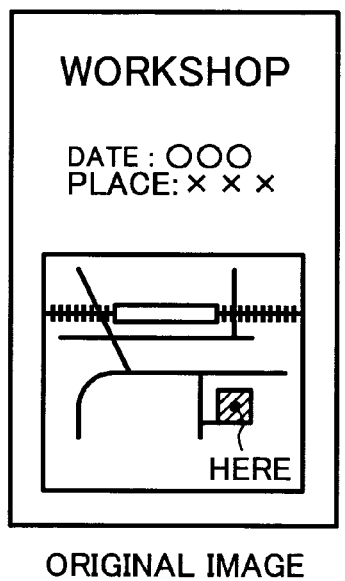
FIGS. 16A-16E are is a diagram illustrating normalizing and aggregating processes performed by an image normalization unit and an image aggregation unit.
Figure 16B:
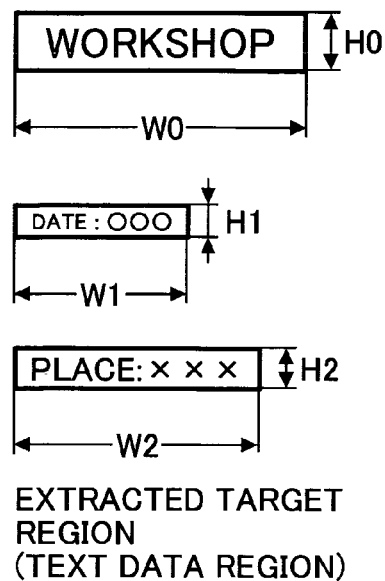
Figure 16C:
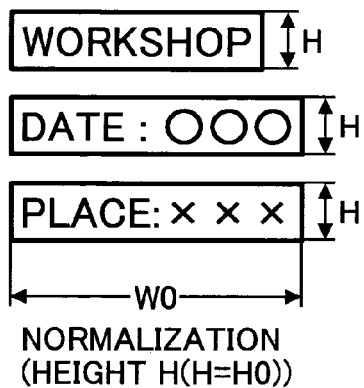

FIG. 16A shows an original image. When text data is specified as a target region, text data regions on the original image of FIG. 16A are extracted as shown in FIG. 16B. Text lines of the extracted text data regions of FIG. 16B have different text heights (i.e., H0, H1 and H2) and different text widths (i.e., W0, W1 and W2). To normalize the heights of the text lines of the extracted text data regions, font sizes in the text lines are enlarged according to the font size in the text line having the largest height (i.e., H0), as shown in FIG. 16C. As an alternative, the normalization of the heights of the text lines may be performed according to the smallest height of the text lines. In such case, font sizes in the text lines are reduced according to the font size in the text line having the smallest text height. Further, as an alternative, the text heights may be normalized according to a human recognizable text size (for example, 60 pixels) or an optimal text size for other processing methods (for example, optical character recognition (OCR)).

After the heights of the text lines of the target regions, the widths of the text lines are normalized. The widths of the text lines of the extracted text data regions are enlarged according to the text line having the largest widths (i.e., W0).

Figure 16D:
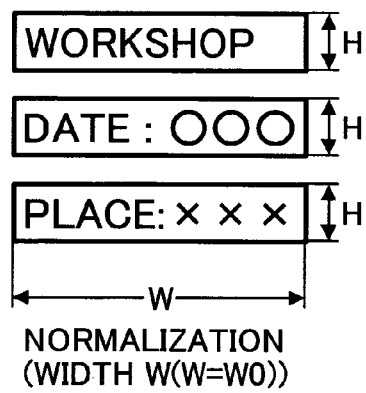

The text line indicating "WORKSHOP" has a smallest text width in FIG. 16C. The width of the text image "WORKSHOP" is normalized according to the largest width of the text lines of the target regions. At this time, the text image "WORKSHOP" is justified to left, and the right side of the text image "WORKSHOP" remains blank as a background white image, as shown in FIG. 16D.

Figure 16E:
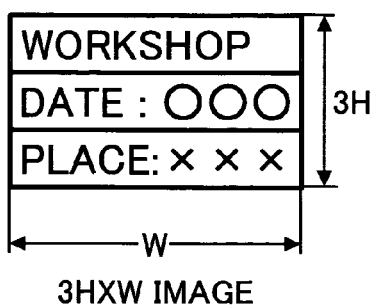

After the image normalization unit 43 normalized the images of the target regions having different heights and different widths, as shown in FIGS. 16A through 16D, the image aggregation unit 44 aggregates the normalized target regions into one image as shown in FIG. 16E. The text lines of the aggregated image have uniform height and width. Thereby, the size of the aggregated image may be 3H×W.

As an alternative, graphic image data may be specified as a target region. When graphic image data is specified as a target region, graphic data regions on the original image are extracted. Since the processes of the normalization operations with respect to the graphic data regions are same as those to the text data regions, the detailed descriptions will be omitted.

The image processing unit 45 performs at least one image processing operations of contrast conversion, color tone conversion, color intensity conversion, noise reduction, smoothing and the like, with respect to the target region aggregated into one image by the image aggregation unit 44. For example, when text image data is selected as a target region, the contrast conversion may be performed to make the text on the image clear. When graphic image data is selected as a target region and the graphic image data includes moiré highlighted against the rest of the regions, the smoothing may be performed to effectively adjust the image. Thus, the at least one image processing operation is performed on the image of the target region aggregated by the image aggregation unit 44, and noises on the image are decreased. Therefore, the data amount of the entire image can be reduced and the image transmission can be made at a higher speed.

The encoding unit 46 encodes the image obtained after the image processing operation by the image processing unit 45, in accordance with the "JPEG2000 algorithm". Since the encoding operation is previously described in the hierarchical coding algorithm of FIG. 1, including the color space transform and inverse transform unit 101, the two-dimensional wavelet transform and inverse transform unit 102, the quantization and inverse quantization unit 103, the entropy coding and decoding unit 104, and the tag processing unit 105, the detailed description of encoding will be omitted.

As previously described, the image normalization unit 43 normalizes the respective target regions to have identical text height and width, which makes respective sizes of the target regions are also identical. This satisfies a condition that a divided size (i.e., an image size) in "tiling" in the "JPEG2000 algorithm" must be identical. Thus, one or a plurality of target regions are divided into tiles, and each of the tiles is compressed and encoded in a wavelet transform and is converted to a JPEG2000 file format, thereby the image size to be transmitted according to the rendering area of the client computer 4 may be changeable. Further, the image divided into tiles in a unit of target region may be decodable into each target region. Accordingly, when a priority is assigned to each target region as previously described, the target regions can be decoded for each order of the priority.

When the client computer 4 transmits the request signal, the data transmission unit 47 extracts the codestream of the requested image size from the image data in a form of the JPEG2000 codestream, according to the rendering area of the client computer 4, and transmits the request signal back to the client computer 4.

As described above, in the image processing system, when the client computer 4 transmits a request signal to the server computer 2, the server computer 2, according to the received request signal, extracts target regions from image data in a form of the JPEG2000 codestream, aggregates the extracted target regions into one image, and divides the aggregated target regions into tiles, so that the target regions after tiling may be converted to a JPEG2000 file format. The server computer 2 determines the size of the image in a form of the JPEG2000 file format to be transmitted, according to the rendering area of the client computer 4, and transmits the image data to the client computer 4. Accordingly, a data transmission time may be reduced and the client computer 4 may quickly confirm the image. Further, in a progressive display, the image data may effectively be displayed.

The above-described embodiments are illustrative, and numerous additional modifications and variations are possible in light of the above teachings. For example, elements and/or features of different illustrative and exemplary embodiments herein may be combined with each other and/or substituted for each other within the scope of this disclosure and appended claims. It is therefore to be understood that within the scope of the appended claims, the disclosure of this patent specification may be practiced otherwise than as specifically described herein.

What is claimed as new and desired to be protected by Letters Patent of the United States is:

1. An image processing apparatus, comprising:
   a receiving mechanism configured to receive a request, from at least one different image processing apparatus connected with the image processing apparatus via a network, for transmission of a codestream generated in a way such that image data is divided into at least one region and each region is hierarchically compressed and stored in the image processing apparatus;
   a decomposing mechanism configured to decompose the codestream and to retrieve the codestream in a component unit;
   an extracting mechanism configured to extract a target region from the codestream;
   a primary priority assigning mechanism configured to assign priority to the target region extracted by the extracting mechanism;
   a primary transmitting mechanism configured for transmission of the codestream, decomposed in a component unit corresponding to the target region, to the at least one different image processing apparatus requesting transmission of the codestream based on the priority assigned by the primary priority assigning mechanism;
   a primary decoding mechanism configured to decode the codestream of the target region having a high priority assigned by the primary priority assigning mechanism;
   an image processing mechanism configured to perform an image processing operation with respect to the image data decoded by the primary decoding mechanism; and
   a primary encoding mechanism configured to hierarchically encode the image data processed by the image processing mechanism,
   wherein the primary transmitting mechanism transmits the codestream, decomposed in a component unit corresponding to the target region encoded after the image processing operation, to the at least one different image processing apparatus requesting transmission of the codestream based on the priority assigned by the primary priority assigning mechanism.

2. The image processing apparatus according to claim 1, wherein the extracting mechanism separates an image into graphic image data and text image data, and extracts the target region based on a separation result.

3. The image processing apparatus according to claim 1, wherein the extracting mechanism separates an image into graphic image data and text image data, and extracts a region of the separated text image data as the target region, and wherein the primary priority assigning mechanism assigns priority to text data considered by the extracting mechanism to be a title in the separated text image data.

4. The image processing apparatus according to claim 1, wherein the extracting mechanism separates an image into graphic image data and text image data, and extracts the separated text image data as the target region, and wherein the primary priority assigning mechanism assigns priority to text image data having a large text size in the separated text image data.

5. The image processing apparatus according to claim 1, wherein the extracting mechanism separates an image into graphic image data and text image data, and extracts the separated graphic image data as the target region, and wherein the primary priority assigning mechanism assigns priority to graphic image data having a large graphic image size in the separated graphic image data.

6. The image processing apparatus according to claim 1, wherein the primary priority assigning mechanism assigns higher priority to a low resolution image of a region extracted as the target region, and assigns a same priority as a region other than the target region to an image other than the low resolution image of the region extracted as the target region.

7. The image processing apparatus according to claim 1, wherein the primary priority assigning mechanism assigns higher priority to a low resolution image of a region extracted as the target region, and assigns a lower priority than a region other than the target region to an image other than the low resolution image of the region extracted as the target region.

8. The image processing apparatus according to claim 1, wherein the primary priority assigning mechanism assigns priority to an important image region based on a quantitative index with respect to a visibility importance in the target region.

9. The image processing apparatus according to claim 1, wherein the primary priority assigning mechanism performs a priority assigning operation according to a rendering area of the different image processing apparatus requesting transmission of the codestream.

10. The image processing apparatus according to claim 1, wherein the image processing mechanism performs at least one operation of contrast conversion, color toner conversion, color intensity conversion, noise reduction and smoothing.

11. A method of processing an image by an image processing apparatus, comprising in a processor of the image processing apparatus:

receiving a request, from at least one different image processing apparatus connected with the image processing apparatus via a network, for transmission of a codestream generated in a way such that image data is divided into at least one region, each region being hierarchically compressed and stored in the image processing apparatus;

decomposing the codestream and retrieving the codestream in a component unit;

extracting a target region from the codestream;

assigning priority to the target region extracted by the extracting step;

transmitting the codestream, decomposed in a component unit corresponding to the target region, to the at least one different image processing apparatus requesting transmission of the codestream based on the priority assigned by the assigning step;

decoding the codestream of the target region having a high priority assigned by the assigning step;

performing an image processing operation with respect to the image data decoded by the decoding step; and hierarchically encoding the image data processed by the performing step, wherein the transmitting step transmits the codestream, decomposed in a component unit corresponding to the target region encoded after the image processing operation, to the at least one different image processing apparatus requesting transmission of the codestream based on the priority assigned by the assigning step.

12. The method according to claim 11, wherein the extracting step separates an image into graphic image data and text image data, and extracts the target region based on a separation result.

13. The method according to claim 11, wherein the extracting step separates an image into graphic image data and text image data, and extracts a region of the separated text image data as the target region, and wherein the assigning step assigns priority to text data responsive to whether the separated text image data includes title data.

14. The method according to claim 11, wherein the extracting step separates an image into graphic image data and text image data, and extracts the separated text image data as the target region, and wherein the assigning steps assigns priority to text image data having a large text size in the separated text image data.

15. The method according to claim 11, wherein the extracting step separates an image into graphic image data and text image data, and extracts the separated graphic image data as the target region, and wherein the assigning step assigns priority to graphic image data having a large graphic image size in the separated graphic image data.

16. The method according to claim 11, wherein the assigning step assigns higher priority to a low resolution image of a region extracted as the target region, and assigns a same priority as a region other than the target region to an image other than the low resolution image of the region extracted as the target region.

17. The method according to claim 11, wherein the assigning step assigns higher priority to a low resolution image of a region extracted as the target region, and assigns a lower priority than a region other than the target region to an image other than the low resolution image of the region extracted as the target region.

18. The method according to claim 11, wherein the assigning step assigns priority to an important image region based on a quantitative index with respect to a visibility importance in the target region.

19. The method according to claim 11, wherein the assigning step performs a priority assigning operation according to a rendering area of the at least one different image processing apparatus requesting transmission of the codestream.

20. The method according to claim 11, wherein the performing step includes the performance of at least one operation of contrast conversion, color toner conversion, color intensity conversion, noise reduction and smoothing.

21. A computer program product stored on a computer readable storage medium for carrying out an image processing method, when running on an image processing apparatus, the image processing method comprising:

receiving a request, from at least one different image processing apparatus connected with the image processing apparatus via a network, for transmission of a codestream generated in a way such that image data is divided into at least one region, each region being hierarchically compressed and stored in the image processing apparatus;

decomposing the codestream and retrieving the codestream in a component unit;

extracting a target region from the codestream;

assigning priority to the target region extracted by the extracting step;

transmitting the codestream, decomposed in a component unit corresponding to the target region, to the at least one different image processing apparatus requesting transmission of the codestream based on the priority assigned by the assigning step;

decoding the codestream of the target region having a high priority assigned by the assigning step;

performing an image processing operation with respect to the image data decoded by the decoding step; and hierarchically encoding the image data processed by the performing step, wherein the transmitting step transmits the codestream, decomposed in a component unit, corresponding to the target region encoded after the image processing operation, to the at least one different image processing apparatus requesting transmission of the codestream based on the priority assigned by the assigning step.

22. The product according to claim 21, wherein the extracting step separates an image into graphic image data and text image data, and extracts the target region based on a separation result.

23. The product according to claim 21, wherein the extracting step separates an image into graphic image data and text image data, and extracts a region of the separated text image data as the target region, and wherein the assigning step assigns priority to text data responsive to whether the separated text image data includes title data.

24. The product according to claim 21, wherein the extracting step separates an image into graphic image data and text image data, and extracts the separated text image data as the target region, and wherein the assigning steps assigns priority to text image data having a large text size in the separated text image data.

25. The product according to claim 21, wherein the extracting step separates an image into graphic image data and text image data, and extracts the separated graphic image data as the target region, and wherein the assigning step assigns priority to graphic image data having a large graphic image size in the separated graphic image data.

26. The product according to claim 21, wherein the assigning step assigns higher priority to a low resolution image of a region extracted as the target region, and assigns the same priority as a region other than the target region to an image other than the low resolution image of the region extracted as the target region.

27. The product according to claim 21, wherein the assigning step assigns higher priority to a low resolution image of a region extracted as the target region, and assigns a lower priority than a region other than the target region to an image other than the low resolution image of the region extracted as the target region.

28. The product according to claim 21, wherein the assigning step assigns priority to an important image region based on a quantitative index with respect to a visibility importance in the target region.

29. The product according to claim 21, wherein the assigning step performs a priority assigning operation according to a rendering area of the at least one different image processing apparatus requesting transmission of the codestream.

30. The product according to claim 21, wherein the performing step includes the performance of at least one operation of contrast conversion, color toner conversion, color intensity conversion, noise reduction and smoothing.

31. A computer readable recoding medium storing computer instructions for performing an image processing method, the method comprising:
receiving a request, from at least one different image processing apparatus connected with the image processing apparatus via a network, for transmission of a codestream generated in a way such that image data is divided into at least one region, each region being hierarchically compressed and stored in the image processing apparatus;
decomposing the codestream and retrieving the codestream in a component unit;
extracting a target region from the codestream;
assigning priority to the target region extracted by the extracting step;
transmitting the codestream, decomposed in a component unit corresponding to the target region, to the at least one different image processing apparatus requesting transmission of the codestream based on the priority assigned by the assigning step;
decoding the codestream of the target region having a high priority assigned by the assigning step;
performing an image processing operation with respect to the image data decoded by the decoding step; and
hierarchically encoding the image data processed by the performing step,
wherein the transmitting step transmits the codestream, decomposed in a component unit, corresponding to the target region encoded after the image processing operation, to the at least one different image processing apparatus requesting transmission of the codestream based on the priority assigned by the assigning step.

32. The storage medium according to claim 31, wherein the extracting step separates an image into graphic image data and text image data, and extracts the target region based on a separation result.

33. The storage medium according to claim 31, wherein the extracting step separates an image into graphic image data and text image data, and extracts a region of the separated text image data as the target region, and wherein the assigning step assigns priority to text data responsive to whether the separated text image data includes title data.

34. The storage medium according to claim 31, wherein the extracting step separates an image into graphic image data and text image data, and extracts the separated text image data as the target region, and wherein the assigning steps assigns priority to text image data having a large text size in the separated text image data.

35. The storage medium according to claim 31, wherein the extracting step separates an image into graphic image data and text image data, and extracts the separated graphic image data as the target region, and wherein the assigning step assigns priority to graphic image data having a large graphic image size in the separated graphic image data.

36. The storage medium according to claim 31, wherein the assigning step assigns higher priority to a low resolution image of a region extracted as the target region, and assigns the same priority as a region other than the target region to an image other than the low resolution image of the region extracted as the target region.

37. The storage medium according to claim 31, wherein the assigning step assigns higher priority to a low resolution image of a region extracted as the target region, and assigns a lower priority than a region other than the target region to an image other than the low resolution image of the region extracted as the target region.

38. The storage medium according to claim 31, wherein the assigning step assigns priority to an important image region based on a quantitative index with respect to a visibility importance in the target region.

39. The storage medium according to claim 31, wherein the assigning step performs a priority assigning operation according to a rendering area of the at least one different image processing apparatus requesting transmission of the codestream.

40. The storage medium according to claim 31, wherein the performing step includes the performance of at least one operation of contrast conversion, color toner conversion, color intensity conversion, noise reduction and smoothing.

41. An image processing apparatus, comprising:
a receiving mechanism configured to receive a request, from at least one different image processing apparatus connected with the image processing apparatus via a network, for transmission of a codestream generated in a way such that image data is divided into at least one region and each region hierarchically compressed and stored in the image processing apparatus;
an extracting mechanism configured to extract a target region from a first codestream;
a secondary decoding mechanism configured to decode a second codestream corresponding to the target region extracted by the extracting mechanism;
a normalization mechanism configured to normalize each line in an image according to a height of the text line of the extracted target region decoded by the secondary decoding mechanism;
an aggregation mechanism configured to aggregate the target region normalized by the normalization mechanism into a new image;
a secondary encoding mechanism configured to divide the new image aggregated by the aggregation mechanism into target regions, and to hierarchically encode the divided target region into a third codestream; and
a secondary transmitting mechanism configured for transmission of a fourth codestream having an image size of the at least one different image processing apparatus requesting transmission of the codestream, to the at least one different image processing apparatus, the fourth codestream being extracted from the third codestream and encoded according to a rendering area of the at least one different image processing apparatus.

42. The image processing apparatus according to claim 41, further comprising:
a secondary priority assigning mechanism configured to assign priority to the target region extracted by the extracting mechanism.

43. The image processing apparatus according to claim 41, further comprising:
an image processing mechanism configured to perform an image processing operation with respect to the image data decoded by the secondary decoding mechanism; and wherein the secondary transmitting mechanism transmits the fourth codestream to the at least one different image processing apparatus.

44. A method of processing an image by an image processing apparatus, comprising in a processor of the image processing apparatus:
receiving a request, from at least one different image processing apparatus connected with the image processing apparatus via a network, for transmission of a codestream generated in a way such that image data is divided into at least one region, each region hierarchically compressed and stored in the image processing apparatus;
extracting a target region from a first codestream;
decoding a second codestream corresponding to the target region extracted by the extracting step;
normalizing each line in an image according to a height of the text line of the extracted target region decoded by the decoding step;
aggregating the target region normalized by the normalizing step into a new image;
dividing the new image aggregated by the aggregating step into target regions, and hierarchically encoding the divided target region into a third codestream; and
transmitting a fourth codestream to the at least one different image processing apparatus, the fourth codestream being encoded from the third codestream according to a rendering area of the at least one different image processing apparatus.

45. The method according to claim 44, further comprising:
assigning priority to the target region extracted by the extracting step.

46. The method according to claim 44, further comprising:
performing an image processing operation with respect to the image data decoded by the decoding step; and wherein the fourth codestream is encoded by the encoding step after the image processing operation is performed by the performing step.

47. A computer program product stored on a computer readable storage medium for carrying out an image processing method, when run on an image processing apparatus, the image processing method comprising:
receiving a request, from at least one different image processing apparatus connected with the image processing apparatus via a network, for transmission of a codestream generated in a way such that image data is divided into at least one region, each region hierarchically compressed and stored in the image processing apparatus;
extracting a target region from a first codestream;
decoding a second codestream corresponding to the target region extracted by the extracting step;
normalizing each line in an image according to a height of the text line of the extracted target region decoded by the decoding step;
aggregating the target region normalized by the normalizing step into a new image;
dividing the new image aggregated by the aggregating step into target regions, and hierarchically encoding the divided target region into a third codestream; and
transmitting a fourth codestream to the at least one different image processing apparatus, the fourth codestream being encoded from the third codestream according to a rendering area of the at least one different image processing apparatus.

48. The product according to claim 47, further comprising:
assigning priority to the target region extracted by the extracting step.

49. The product according to claim 47, further comprising:
performing an image processing operation with respect to the image data decoded by the decoding step; and wherein the fourth codestream is encoded by the encoding step after the image processing operation is performed by the performing step.

50. A computer readable recoding medium storing computer instructions for performing an image processing method, the method comprising:
receiving a request, from at least one different image processing apparatus connected with the image processing apparatus via a network, for transmission of a codestream generated in a way such that image data is divided into at least one region, each region hierarchically compressed and stored in the image processing apparatus;
extracting a target region from a first codestream;
decoding a second codestream corresponding to the target region extracted by the extracting step;
normalizing each line in an image according to a height of the text line of the extracted target region target region decoded by the decoding step;
aggregating the target region normalized by the normalizing step into a new image;
dividing the new image aggregated by the aggregating step into target regions, and hierarchically encoding the divided target region into a third codestream; and
transmitting a fourth codestream to the at least one different image processing apparatus, the fourth codestream being encoded from the third codestream according to a rendering area of the at least one different image processing apparatus.

51. The storage medium according to claim 50, further comprising:
assigning priority to the target region extracted by the extracting step.

52. The storage medium according to claim 50, further comprising:
performing an image processing operation with respect to the image data decoded by the decoding step; and wherein the fourth codestream is encoded by the encoding step after the image processing operation is performed by the performing step.

* * * * *